United States Patent
Zhuang et al.

(10) Patent No.: US 12,086,718 B2
(45) Date of Patent: Sep. 10, 2024

(54) MACHINE LEARNING SYSTEMS AND METHODS FOR ATTRIBUTED SEQUENCES

(71) Applicant: Amadeus S.A.S., Biot (FR)

(72) Inventors: Zhongfang Zhuang, Worcester, MA (US); Aditya Arora, Sophia Antipolis (FR); Jihane Zouaoui, Sophia Antipolis (FR); Xiangnan Kong, New Haven, CT (US); Elke Rundensteiner, Acton, MA (US)

(73) Assignee: Amadeus S.A.S., Biot (FR)

( * ) Notice: Subject to any disclaimer, the term of this patent is extended or adjusted under 35 U.S.C. 154(b) by 1328 days.

(21) Appl. No.: 16/057,025

(22) Filed: Aug. 7, 2018

(65) Prior Publication Data

US 2020/0050941 A1     Feb. 13, 2020

(51) Int. Cl.
*G06N 3/084* (2023.01)
*G06N 3/044* (2023.01)
*G06N 3/045* (2023.01)

(52) U.S. Cl.
CPC ............ *G06N 3/084* (2013.01); *G06N 3/044* (2023.01); *G06N 3/045* (2023.01)

(58) Field of Classification Search
None
See application file for complete search history.

(56) References Cited

U.S. PATENT DOCUMENTS

| | | |
|---|---|---|
| 9,263,036 B1 | 2/2016 | Graves |
| 10,977,664 B2 * | 4/2021 | Yang ...................... G06N 3/045 |
| 11,030,523 B2 | 6/2021 | Zoph et al. |

(Continued)

FOREIGN PATENT DOCUMENTS

| | | |
|---|---|---|
| CN | 106919977 A | 7/2017 |
| CN | 107622485 A | 1/2018 |
| CN | 108021983 A | 5/2018 |

OTHER PUBLICATIONS

Krause, J. et al., "A hierarchical approach for generating descriptive image paragraphs," Proc. of the IEEE Conf. on Computer Vision and Pattern Recognition (CVPR 2017) pp. 317-325. (Year: 2017).*

(Continued)

*Primary Examiner* — Brian M Smith
(74) *Attorney, Agent, or Firm* — Thompson Hine LLP

(57) ABSTRACT

Machine learning systems and methods for embedding attributed sequence data. The attributed sequence data includes an attribute data part having a fixed number of attribute data elements and a sequence data part having a variable number of sequence data elements. An attribute network module includes a feedforward neural network configured to convert the attribute data part to an encoded attribute vector having a first number of attribute features. A sequence network module includes a recurrent neural network configured to convert the sequence data part to an encoded sequence vector having a second number of sequence features. In use, the machine learning system learns and outputs a fixed-length feature representation of input attributed sequence data which encodes dependencies between different attribute data elements, dependencies between different sequence data elements, and dependencies between attribute data elements and sequence data elements within the attributed sequence data.

9 Claims, 8 Drawing Sheets

(56) References Cited

U.S. PATENT DOCUMENTS

| | | |
|---|---|---|
| 2016/0350653 A1 | 12/2016 | Socher et al. |
| 2019/0019193 A1* | 1/2019 | Isaiah .................. G06Q 20/405 |
| 2019/0278378 A1* | 9/2019 | Yan ..................... G06Q 30/0242 |
| 2021/0035141 A1* | 2/2021 | Das ....................... G06N 3/0472 |
| 2021/0089571 A1* | 3/2021 | Perone ................... G06F 40/30 |

OTHER PUBLICATIONS

Pu, Y. et al., "Variational autoencoder for deep learning of images, labels, and captions," Advances in Neural Information Processing Systems (NIPS 2016) pp. 2352-2360. (Year: 2016).*

Johnson, J. et al., "Densecap: fully convolutional localization networks for dense captioning," Proc. of the IEEE Conf. on Computer Vision and Pattern Recognition (CVPR 2016) pp. 4565-4574. (Year: 2016).*

Chen, G., "A gentle tutorial of recurrent neural network with error backpropagation," downloaded from <https://arxiv.org/abs/1610.02583> (Jan. 14, 2018) 10 pp. (Year: 2018).*

Kiasari, M.A. et al., "Generative moment matching autoencoder with perceptual loss," International Conf. on Neural Information Processing (ICONIP 2017) pp. 226-234. (Year: 2017).*

Chen, H. et al., "Show, observe, and tell: attribute-driven attention model for image captioning," Proc. 27th Intl. Joint Conf. on Artificial Intelligence (Jul. 2018) pp. 606-612. (Year: 2018).*

Donahue, J. et al., "Long-term recurrent convolutional networks for visual recognition and description," Proc. of the IEEE Conf. on Computer Vision and Pattern Recognition (CVPR 2015) pp. 2625-2624. (Year: 2015).*

Kingma, D.P. et al., "Auto-encoding variational Bayes," downloaded from <https://arxiv.org/pdf/1312.6114.pdf> (May 1, 2014) 14 pp. (Year: 2014).*

Donahue, J. et al, "Long-term Recurrent Convolutional Networks for Visual Recognition and Description," v4 downloaded from <arxiv.org/abs/1411.4389>, 14 pp. (Year: 2016).*

"Loss Functions" from the "ML Cheatsheet" downloaded from <ml-cheatsheet.readthedocs.io/en/latest/loss_functions.html> (verified online at least as of Jan. 2018, by the Internet Archive). (Year: 2018).*

Bhat, R.R. et al., "Identifying Nontechnical Power Loss via Spatial and Temporal Deep Learning" 2016 15th IEEE Intl. Conf. on Machine Learning and Applications (2016) 8 pp. (Year: 2016).*

Jaiswal, A. et al., "Multimedia semantic integrity assessment using joint embedding of images and text," Proc. of the 25th ACM Intl. Conf. on Multimedia (2017) pp. 1465-1471. (Year: 2017).*

Akata et al., "Label-Embedding for Attribute-Based Classification" the IEEE Conference on Computer Vision and Pattern Recognition (CVPR), 2013, pp. 819-826.

Bastien et al., "Theano: new features and speed improvements" Presented at the Deep Learning Workshop, NIPS 2012.

Bechet et al., "Sequence mining under multiple constraints", Proceedings of the 30th Annual ACM Symposium on Applied Computing, pp. 908-914, Salamanca, Spain, Apr. 13-17, 2015.

Bernhard et al., "Clickstream Prediction Using Sequential Stream Mining Techniques with Markov Chains", Proceedings of the 20th International Database Engineering & Applications Symposium, pp. 24-33, Montreal, QC, Canada, Jul. 11-13, 2016.

Campello, et al., "Hierarchical density estimates for data clustering, visualization, and outlier detection", ACM Transactions on Knowledge Discovery from Data, New York, p. 5:1-5:51, Jul. 2015.

Cho et al., "Learning Phrase Representations using RNN Encoder-Decoder for Statistical Machine Translation", Proceedings of the 2014 Conference on Empirical Methods in Natural Language Processing (EMNLP), pp. 1724-1734, Oct. 25-29, 2014, Doha, Qatar. (c) 2014 Association for Computational Linguistics.

Egho et al., "A parameter-free approach for mining robust sequential classification rules" 2015 IEEE International Conference on Data Mining, 2015, pp. 745-750.

Fowkes et al., "A Subsequence Interleaving Model for Sequential Pattern Mining" Proceedings of the 22nd ACM SIGKDD International Conference on Knowledge Discovery and Data Mining, pp. 835-844, San Francisco, California, USA, Aug. 13-17, 2016.

Gibert et al., "Graph embedding in vector spaces by node attribute statistics" Journal Pattern Recognition archive vol. 45 Issue 9, Sep. 2012, pp. 3072-3083.

Glorot et al., "Understanding the difficulty of training deep feedforward neural networks", Proceedings of the 13th International Conference on Artificial Intelligence and Statistics (AISTATS) 2010, Chia Laguna Resort, Sardinia, Italy. vol. 9 of JMLR: W&Cp 9. Copyright 2010.

Hochreiter et al., "Long short-term memory" Neural Computation 9(8):1735{1780, 1997.

Kalchbrenner et al., "Recurrent Continuous Translation Models", Proceedings of the 2013 Conference on Empirical Methods in Natural Language Processing, pp. 1700-1709, Seattle, Washington, USA, Oct. 18-21, 2013. (c) 2013 Association for Computational Linguistics.

Karpathy et al., "Deep Visual-Semantic Alignments for Generating Image Descriptions", : IEEE Transactions on Pattern Analysis and Machine Intelligence, vol. 39, Issue: 4, Apr. 1, 2017.

Khaleghi et al., "Consistent Algorithms for Clustering Time Series", Journal of Machine Learning Research 17 (2016) 1-32.

Lakshminarayan et al., "Modeling Complex Clickstream Data by Stochastic Models: Theory and Methods", Proceedings of the 25th International Conference Companion on World Wide Web, pp. 879-884, Montréal, Quebec, Canada, Apr. 11-15, 2016.

Liou et al., "Autoencoder for words", Neurocomputing 139 (2014) 84-96.

Liou et al., "Modeling word perception using the Elman network", Neurocomputing 71 (2008) 3150-3157.

Luong et al., "Multi-task Sequence to Sequence Learning", Published 2015 in ArXiv.

Van der Maaten et al., "Visualizing Data using t-SNE", Journal of Machine Learning Research 9 (2008) 2579-2605.

Malhotra et al., "Long Short Term Memory Networks for Anomaly Detection in Time Series", ESANN 2015 proceedings, European Symposium on Artificial Neural Networks, Computational Intelligence and Machine Learning. Bruges (Belgium), Apr. 22-24, 2015.

Miliaraki et al., "Mind the Gap: Large-Scale Frequent Sequence Mining", SIGMOD'13, Jun. 22-27, 2013, New York, New York, USA. Copyright 2013 ACM.

Nair et al., "Rectified Linear Units Improve Restricted Boltzmann Machines", Proceedings of the 27th International Conference on Machine Learning, Haifa, Israel, 2010. Copyright 2010.

Ngiam et al., "Multimodal Deep Learning", Proceedings of the 28 th International Conference on Machine Learning, Bellevue, WA, USA, 2011.

Pedersen et al., "Multidimensional Data Modeling for Complex Data", Proceedings 15th International Conference on Data Engineering, Sydney, NSW, Australia, 1999, pp. 336-345.

Saxe et al., "Exact solutions to the nonlinear dynamics of learning in deep linear neural networks", Submission to ICLR2014, Dec. 20, 2013.

Schlegl et al., "Unsupervised Anomaly Detection with Generative Adversarial Networks to Guide Marker Discovery" Information Processing in Medical Imaging, 2017, Lecture Notes in Computer Science, vol. 10265.

Sutskever et al., "Sequence to Sequence Learning with Neural Networks" Advances in Neural Information Processing Systems 27 (NIPS 2014).

Wang et al., "Generalized Autoencoder: A Neural Network Framework for Dimensionality Reduction" the IEEE Conference on Computer Vision and Pattern Recognition (CVPR) Workshops, 2014, pp. 490-497.

Wei et al., "Effective detection of sophisticated online banking fraud on extremely imbalanced data", World Wide Web (2013) https://doi.org/10.1007/s11280-012-0178-0.

West et al., "Human Wayfinding in Information Networks" WWW 2012, Apr. 16-20, 2012, Lyon, France.

(56) References Cited

OTHER PUBLICATIONS

West et al., "Wikispeedia: An Online Game for Inferring Semantic Distances between Concepts" Proceedings of the Twenty-First International Joint Conference on Artificial Intelligence (IJCAI 2009).
Yang et al., "CLUSEQ: Efficient and Effective Sequence Clustering", Proceedings of the 19th International Conference on Data Engineering (ICDE 2003).
Davis et al., "Information-Theoretic Metric Learning", Proceedings of the 24th international conference on Machine learning, pp. 209-216, Corvalis, Oregon, Jun. 20-24, 2007.
Erhan, "The Difficulty of Training Deep Architectures and the Effect of Unsupervised Pre-Training", Proceedings of the 12th International Conference on Artificial Intelligence and Statistics (AISTATS) 2009, Clearwater Beach, Florida, vol. 5 of JMLR: W&Cp 5. Copyright 2009.
Alex Graves, "Generating Sequences With Recurrent Neural Networks" Aug. 4, 2013, arXiv:1308.0850.
Hadsell et al., "Dimensionality Reduction by Learning an Invariant Mapping", 2006 IEEE Computer Society Conference on Computer Vision and Pattern Recognition, New York, NY, 2006, pp. 1735-1742.
Hu et al., "Discriminative Deep Metric Learning for Face Verification in the Wild" the IEEE Conference on Computer Vision and Pattern Recognition (CVPR), 2014, pp. 1875-1882.
Kedem et al., "Non-linear Metric Learning" Advances in Neural Information Processing Systems 25 (NIPS 2012).
Koch et al., "Siamese Neural Networks for One-Shot Image Recognition" ICML Deep Learning Workshop. vol. 2. 2015.
Kostinger et al., "Large Scale Metric Learning from Equivalence Constraints", 2012 IEEE Conference on Computer Vision and Pattern Recognition, Providence, RI, 2012, pp. 2288-2295.
McDaid et al., "Normalized Mutual Information to evaluate overlapping community finding algorithms" Submitted on Oct. 11, 2011, arXiv:1110.2515.
Mignon et al., "PCCA: A new approach for distance learning from sparse pairwise constraints" 2012 IEEE Conference on Computer Vision and Pattern Recognition, Providence, RI, 2012, pp. 2666-2672.
Mueller et al., "Siamese Recurrent Architectures for Learning Sentence Similarity", Proceedings of the Thirtieth AAAI Conference on Artificial Intelligence (AAAI 2016).
Neculoiu et al., "Learning Text Similarity with Siamese Recurrent Networks" Proceedings of the 1st Workshop on Representation Learning for NLP, pp. 148-157, Berlin, Germany, Aug. 11, 2016. (c) 2016 Association for Computational Linguistics.
Pham et al., "col. Networks for Collective Classification" Proceedings of the Thirty-First AAAI Conference on Artificial Intelligence (AAAI 2017).
Wang et al., "Integrating Distance Metrics Learned from Multiple Experts and its Application in Patient Similarity Assessment" Proceedings of the 2011 SIAM International Conference on Data Mining.
Wang et al., "Parametric Local Metric Learning for Nearest Neighbor Classification" Advances in Neural Information Processing Systems 25 (NIPS 2012).
Xing et al., "Distance Metric Learning, with Application to Clustering with Side-Information", Advances in neural information processing systems. 2003.
Xu et al., "Show, Attend and Tell: Neural Image Caption Generation with Visual Attention", Proceedings of the 32nd International Conference on Machine Learning, Lille, France, 2015.
Xu et al., "Decoupling Encoder and Decoder Networks for Abstractive Document Summarization", Proceedings of the MultiLing 2017 Workshop on Summarization and Summary Evaluation Across Source Types and Genres, pp. 7-11, Valencia, Spain, Apr. 3, 2017. (c) 2017 Association for Computational Linguistics.
Yeung et al., "A Kernel Approach for Semi-Supervised Metric" IEEE Transactions on Neural Networks, vol. 18, No. 1, pp. 141-149, Jan. 2007.
Chatpatanasiri et al., "A new kernelization framework for Mahalanobis distance learning algorithms", Neurocomputing vol. 73, Issues 10-12, Jun. 2010, pp. 1570-1579.
Wang et al., "Survey on distance metric learning and dimensionality reduction in data mining", J. Data Min Knowl Disc (2015) 29: 534.
Yager et al., "Probabilistically Weighted OWA Aggregation," in IEEE Transactions on Fuzzy Systems, vol. 22, No. 1, pp. 46-56, Feb. 2014.
Brinton et al., "Mining MOOC Clickstreams: Video-Watching Behavior vs. In-Video Quiz Performance," IEEE Transactions on Signal Processing, vol. 64, No. 14, pp. 3677-3692, Jul. 15, 15, 2016.
Kuan et al., "A Sequential Embedding Approach for Item Recommendation with Heterogeneous Attributes", arXiv e-prints May 28, 2018.
Zhongfang Zhuang "Zhongfang Zhuang" retrieved from the internet Mar. 22, 2018 at https://web.cs.wpi.edu/~zzhuang/.
National Institute of Industrial Property, Preliminary Search Report issued in French Patent Application No. 1857340 dated Jul. 5, 2019.
China National Intellectual Property Administration, First Office Action and Search Report issued in Chinese patent application serial No. 201910719231.0 on Sep. 28, 2023; 9 pages.

\* cited by examiner

MACHINE LEARNING SYSTEMS AND METHODS FOR ATTRIBUTED SEQUENCES

FIELD OF THE INVENTION

The present invention relates to applications of machine learning. In particular, embodiments of the invention provide for both unsupervised and supervised learning of feature embeddings for attributed sequences, i.e., data instances comprising both fixed-length attribute data and variable-length sequence data, having desirable properties for use in practical applications including (but not limited to) fraud detection, and analysis and data mining of clickstreams of web users, purchase histories of online customers, or DNA sequences.

BACKGROUND

Sequential data arises naturally in a wide range of applications. Examples of sequential data include clickstreams of web users, purchase histories of online customers, and DNA sequences of genes. Sequential data comprises variable-length sequences of categorical items, and typically requires careful design of a feature representation before being fed to a learning algorithm. One approach to feature learning on sequential data is called sequence embedding, in which the goal is to transform a variable-length sequence into a fixed-length feature representation.

Prior art methods for sequence embedding focus on learning from sequential data alone. However, in many real-world applications, variable-length sequences are often associated with a fixed-size set of attributes. For example, in an online purchasing system, each user transaction includes both a sequence of user actions (e.g., 'login', 'search', 'add item to shopping cart', 'check out', etc) and a set of attributes (e.g., 'user name', 'browser', and 'IP address') indicating the context of the transaction. As another example, in gene function analysis, each gene can be represented by both a DNA sequence and a set of attributes indicating the expression levels of the gene in different types of cells.

In sequence embedding problems, conventional methods focus on modelling item dependencies, i.e., the dependencies between different items within a sequence. However, a given ordering of items may have different meanings when associated with different attribute values. Learning an embedding having desirable properties for practical applications therefore requires joint consideration of three types of dependencies: item dependencies (i.e., the dependencies between different items in the sequence); attribute dependencies (i.e., the dependencies between different attributes); and attribute-sequence dependencies (i.e., the dependencies between attributes and items in a sequence).

A closely-related problem is distance metric learning. It is often desirable that the feature representation of observed data has the property that similar observations have similar features, i.e., that such observations are clustered in the feature space while the representations of dissimilar observations are more distantly separated. In distance metric learning, the goal is therefore to learn a suitable distance metric based on a set of similar/dissimilar pairs of instances. Many real-world applications, from information retrieval to health care informatics, can benefit greatly from distance metric learning. For example, in health care informatics, it may be desirable to learn a distance metric that accurately measures the similarity between patients to find correct treatments for the patients.

Conventional approaches to distance metric learning generally focus on learning a Mahalanobis distance metric, which is equivalent to learning a linear transformation on data attributes. In nonlinear settings, a nonlinear mapping function may first be learned to project the instances into a new space, and then the final metric becomes the Euclidean distance metric in that space. Deep metric learning has often been the method of choice in practice for learning nonlinear mappings. While progress has been made on metric learning with sequential data, the challenges discussed above again arise where the sequential data is dependent upon associated context/attributes.

For many practical applications, therefore, effective systems and methods are required for learning features and distance metrics for data sets and observations comprising fixed-length attribute data along with associated variable-length sequential data.

SUMMARY

In one aspect, embodiments of the invention provide a machine learning system for embedding attributed sequence data comprising an attribute data part having a fixed number of attribute data elements and a sequence data part having a variable number of sequence data elements into a fixed-length feature representation. The system includes an attribute network module comprising a feedforward neural network configured to convert the attribute data part to an encoded attribute vector having a first predetermined number of attribute features, and a sequence network module comprising a recurrent neural network configured to convert the sequence data part to an encoded sequence vector having a second predetermined number of sequence features. The attribute network module and the sequence network module may be operatively coupled such that, in use, the machine learning system is configured to learn and output a fixed-length feature representation of input attributed sequence data which encodes dependencies between different attribute data elements in the attribute data part, dependencies between different sequence data elements in the sequence data part, and dependencies between attribute data elements and sequence data elements within the attributed sequence data.

Advantageously, coupling of the attribute network module comprising a feedforward neural network with the sequence network module comprising a recurrent neural network enables the system to learn a nonlinear function of input attributed sequence data which is able to account for both homogeneous dependencies (i.e., those within the attribute and sequence data parts) and heterogeneous dependencies (i.e., those between the attribute and sequence data parts) of items within attributed sequences.

In embodiments of the invention, the attribute network module comprises a multilayer feedforward neural network having an attribute vector output layer which comprises the first predetermined number of units, and the recurrent neural network of the sequence network module comprises a long short-term memory (LSTM) network having the second predetermined number of hidden units. In this way, the number of features in the attribute vector becomes a design parameter of the attribute network, while the number of features in the sequence vector becomes a design parameter of the sequence network. Advantageously, the design parameters are independent of the number of attribute data elements, the length of any sequence data part, and the number of distinct items comprising the sequence data.

In another aspect, embodiments of the invention provide a training method of a machine learning system for embedding attributed sequence data comprising an attribute data part having a fixed number of attribute data elements and a sequence data part having a variable number of sequence data elements into a fixed-length feature representation. The machine learning system comprises a multilayer feedforward neural network having an attribute data input layer and an attribute vector output layer which comprises a first predetermined number of units, operatively coupled to an LSTM network which comprises a second predetermined number of hidden units. The training method includes providing a dataset comprising a plurality of attributed sequences and, for each attributed sequence in the dataset, training the multilayer feedforward neural network using the attribute data part of the attributed sequence via back-propagation with respect to a first objective function, and training the LSTM network using the sequence data part of the attributed sequence via back-propagation with respect to a second objective function. Training of the multilayer feedforward neural network is coupled with training the LSTM network such that, when trained, the machine learning system is configured to output a fixed-length feature representation of input attributed sequence data which encodes dependencies between different attribute data elements in the attribute data part, dependencies between different sequence data elements in the sequence data part, and dependencies between attribute data elements and sequence data elements within the attributed sequence data.

It is a further advantage that, in various embodiments of the invention, different coupling arrangements may be employed, resulting in alternative network architectures that are able to generate different embeddings of input attributed sequence data.

Accordingly, in one exemplary arrangement, the attribute network module is operatively coupled to the sequence network module by passing an output of the attribute vector output layer to an attribute vector input of the sequence network module. In particular, the attribute vector input of the sequence network module may comprise a hidden state of the LSTM network at a first evaluation step, the first predetermined number of attribute vector output layer units may be equal to the second predetermined number of sequence network module hidden units, and the fixed-length feature representation of input attributed sequence data may comprise a hidden state of the LSTM network at a final evaluation step. In this case, the number of features in the resulting embedding is equal to the second predetermined number, i.e., the number of hidden units in the LSTM network.

In a related embodiment of the training method, the multilayer feedforward neural network comprises an encoder having an encoder input layer which comprises the attribute data input layer and an encoder output layer which comprises the attribute vector output layer. The encoder further comprises a decoder having a decoder input layer coupled to the encoder output layer, and a decoder output layer which comprises a reconstructed estimate of an input to the encoder input layer. The first objective function may comprise a distance measure between the input to the encoder input layer and the reconstructed estimate. Training the multilayer feedforward neural network may then comprise iteratively performing steps of forward- and back-propagation with the attribute data part of the attributed sequence as input to the encoder input layer until the distance measure satisfies a first convergence target. The second objective function may comprise a likelihood measure of incorrect prediction of a next sequence item at each one of a plurality of training time steps of the LSTM network. Training the LSTM network may comprise iteratively repeating the plurality of training time steps until the likelihood measure satisfies a second convergence target. Each iteration comprises, at a first training time step, copying the output of the attribute vector output layer to a hidden state of the LSTM network; and, at a final training time step, computing the likelihood measure. The distance measure may comprise a mean-squared-error loss function and the likelihood measure may comprise a categorical cross-entropy loss function.

In another exemplary arrangement, the attribute network is operatively coupled to the sequence network module by passing an output of the sequence network module to an input layer of the attribute network module. In particular, a number of units in the input layer of the attribute network module may be equal to a sum of the fixed number of attribute data elements and the second predetermined number of sequence network module hidden units, the output of the sequence network module may comprise a hidden state of the LSTM network at a final evaluation step, which is concatenated with the fixed number of attribute data elements to produce a concatenated attribute network input vector which is passed to the input layer of the attribute network module, and the fixed-length feature representation of input attributed sequence data may comprise an output of the attribute vector output layer. In this case, the number of features in the resulting embedding is equal to the first predetermined number, i.e., the number of units in the attribute vector output layer.

In a related embodiment of the training method, the second objective function may comprise a likelihood measure of incorrect prediction of a next sequence item at each one of a plurality of training time steps of the LSTM network, and training the LSTM network may comprise iteratively repeating the plurality of training time steps until the likelihood measure satisfies a first convergence target. Each iteration may comprise: at a first training time step, copying the output of the attribute vector output layer to a hidden state of the LSTM network; and, at a final training time step, computing the likelihood measure. The multilayer feedforward neural network may comprise an encoder having an encoder input layer which comprises the attribute data input layer and an encoder output layer which comprises the attribute vector output layer; and a decoder having a decoder input layer coupled to the encoder output layer, and a decoder output layer which comprises a reconstructed estimate of an input to the encoder input layer. The first objective function may comprise a distance measure between the input to the encoder input layer and the reconstructed estimate. Training the multilayer feedforward neural network may comprise applying, to the encoder input layer, a hidden state of the LSTM network at the final training time step concatenated with the fixed number of attribute data elements, and iteratively performing steps of forward-propagation and back-propagation until the distance measure satisfies a second convergence target.

In yet another exemplary arrangement, the attribute network is operatively coupled to the sequence network via a fusion network that comprises an input concatenation layer which is configured to concatenate an output of the attribute vector output layer with an output of the sequence network module, and a nonlinear function module that is configured to learn a nonlinear function of the concatenated inputs which encodes dependencies between attribute data elements and sequence data elements within the attributed sequence data. In particular, a number of units in the input concatenation layer may be equal to a sum of the first predetermined number of attribute features and the second predetermined number of sequence features, the output of the sequence network module may comprise a hidden state of the LSTM network at a final evaluation step, the nonlinear function module may comprise a fully-connected feedforward neural network layer, and the fixed-length feature representation of input attributed sequence data may comprise an output vector of the fully-connected feedforward neural network layer.

In this case, the number of features in the resulting embedding is equal to the size of the output of the nonlinear function module, and in particular may be equal to the sum of the first and second predetermined numbers, i.e., the combined count of units in the attribute vector output layer and hidden units in the LSTM network.

In some embodiments, advantageously configured to learn an embedding in a supervised manner using labeled samples of similar and dissimilar attributed sequences, the system further comprises a metric network module bidirectionally coupled to the attribute network module and the sequence network module. The metric network module is configured to receive pairs of fixed-length feature representations of corresponding samples of attributed sequence data. Each pair is labeled to indicate whether it comprises similar or dissimilar attributed sequence data. The metric network module is further configured to compute gradient information based upon a loss function defined in terms of a predetermined distance metric. It is an objective to learn an embedding whereby the pairs of fixed-length feature representations of corresponding samples of attributed sequence data have a smaller distance under the distance metric when labeled as similar than when labeled as dissimilar. The metric network module is further configured to back-propagate the gradient information through the attribute network module and the sequence network module whereby parameters of the attribute network module and the sequence network module are updated towards achieving the objective.

In yet another aspect, an embodiment of the invention provides a training method of a machine learning system for embedding attributed sequence data comprising an attribute data part having a fixed number of attribute data elements and a sequence data part having a variable number of sequence data elements into a fixed-length feature representation. The machine learning system comprises a multilayer feedforward neural network having an attribute data input layer and an attribute vector output layer which comprises a first predetermined number of units, a long short-term memory (LSTM) network which comprises a second predetermined number of hidden units, and a fusion network comprising an input concatenation layer having a number of units equal to a sum of the first predetermined number of attribute features and the second predetermined number of sequence features, and a nonlinear function layer comprising a fully-connected feedforward neural network layer. The training method comprises providing a dataset comprising a plurality of pairs of attributed sequences, wherein each pair is labeled to indicate whether it comprises similar or dissimilar attributed sequence data. For each pair of attributed sequences in the dataset, the method includes computing, using the multilayer feedforward neural network, a pair of attribute vectors, each having the first predetermined number of elements, corresponding with attribute data parts of the attributed sequences, computing, using the LSTM network, a pair of sequence vectors, each having the second predetermined number of elements, corresponding with sequence data parts of the attributed sequences, concatenating corresponding ones of the computed attribute and sequence vectors to generate a pair of fixed-length feature representations of the pair of attributed sequences, computing a nonlinear transformation function of the fixed-length feature representations to generate a pair of transformed feature representations, computing gradient information based upon a loss function defined in terms of a predetermined distance metric on the transformed feature representations. It is an objective to learn an embedding whereby the pairs of fixed-length feature representations of corresponding samples of attributed sequence data have a smaller distance under the distance metric when labeled as similar than when labeled as dissimilar. For each pair of attributed sequences in the dataset, the method includes back-propagating the gradient information through the multilayer feedforward neural network and the LSTM network, whereby parameters of the attribute network module and the sequence network module are updated towards achieving the objective.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features.

DETAILED DESCRIPTION

Figure 1:
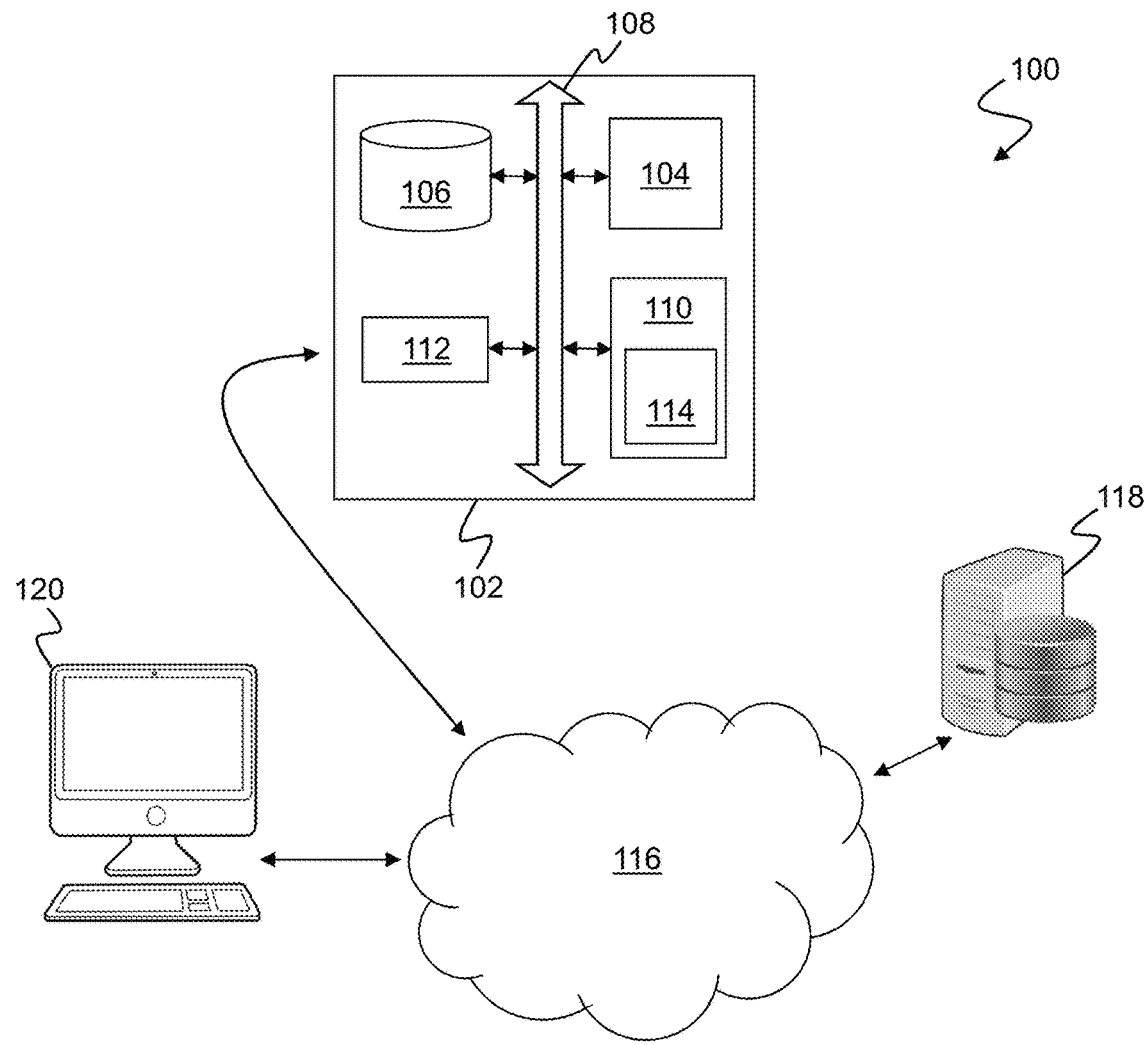
FIG. 1 is a block diagram illustrating an exemplary networked system including an e-commerce fraud detection system in accordance with an embodiment of the invention.

FIG. 1 is a block diagram illustrating an exemplary networked system 100 including a fraud detection system 102 embodying the invention. In particular, the fraud detection system 102 comprises a machine learning system configured to generate embeddings of attributed sequence data in accordance with an embodiment of the invention. As will be understood by persons skilled in the art of machine learning, the term 'embedding' refers to a feature representation of input data samples whereby characteristics of the data are encoded within a feature space such that similarity or difference between samples can be represented by a measure of distance in the feature space. The meaning of the term 'attributed sequence' is discussed in greater detail below with reference to FIG. 2. It should be appreciated that the example of a fraud detection system 100 is provided by way of illustration only, as a specific context within which to illustrate the principles of the invention, and to assist skilled persons in putting these principles into practical effect. The embodiments of the invention can be applied, however, in other contexts in which it is advantageous to generate embeddings of attributed sequence data, such as in analysis and data mining of clickstreams of web users (e.g., for targeted advertising or recommender systems), purchase histories of online customers, or DNA sequences.

The fraud detection system 102 may comprise a computer system having an architecture. In particular, the fraud detection system 102, as illustrated, comprises a processor 104. The processor 104 is operably associated with a non-volatile memory/storage device 106, e.g., via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the fraud detection system 102.

In a configuration, the storage device 106 maintains program and data content relevant to the normal operation of the fraud detection system 102. For example, the storage device 106 may contain operating system programs and data, as well as other executable application software necessary for the intended functions of the fraud detection system 102. The storage device 106 also contains program instructions which, when executed by the processor 104, cause the fraud detection system 102 to perform operations relating to embodiments of the present invention, such as are described in greater detail below, and with reference to FIGS. 5 to 12 in particular. In operation, instructions and data held on the storage device 106 are transferred to volatile memory 110 for execution on demand.

The processor 104 is also operably associated with a communications interface 112. The communications interface 112 facilitates access to a wide-area data communications network, such as the Internet 116.

In use, the volatile storage 110 contains a corresponding body of program instructions 114 transferred from the storage device 106 and configured to perform processing and other operations embodying features of the embodiments of the present invention. The program instructions 114 comprise a technical contribution to the art developed and configured specifically to implement embodiments of the invention, over and above well-understood, routine, and conventional activity in the art of machine learning systems, as further described below, particularly with reference to FIGS. 5 to 13.

With regard to the preceding overview of the fraud detection system 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), field-programmable gate arrays (FPGAs), application-specific integrated circuits (ASICs), and/or other hardware devices suitable for efficient execution of required programs and algorithms. As will be appreciated by persons skilled in the art, GPUs in particular may be employed for high-performance implementation of the deep neural networks comprising various embodiments of the invention, under control of one or more general purpose CPUs.

Computing systems may include personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the terms 'processing unit' and 'module' are used in this specification to refer to any suitable combination of hardware and software configured to perform a particular defined task, such as accessing and processing offline or online data, executing unsupervised or supervised training steps of a machine learning model, executing feature embedding steps of a machine learning model, executing distance metric evaluation steps, or executing fraud detection steps. Such a processing unit or module may comprise executable code executing at a single location on a single processing device, or may comprise cooperating executable code modules executing in multiple locations and/or on multiple processing devices. For example, in some embodiments of the invention, embedding of data samples may be performed entirely by code executing on a single system, such as the fraud detection system 102, while in other embodiments corresponding processing may be performed in a distributed manner over a plurality of systems.

Software components, e.g., program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, the Python programming language, the R programming language, and/or other languages suitable for implementation of machine learning algorithms. Development of software modules embodying the invention may be supported by the use of machine learning code libraries such as the TensorFlow, Torch, and Keras libraries. It will be appreciated by skilled persons, however, that embodiments of the invention involve the implementation of software structures and code that are not well-understood, routine, or conventional in the art of machine learning systems, and that while pre-existing libraries may assist implementation, they require specific configuration and extensive augmentation (i.e., additional code development) in order to implement the specific structures, processing, computations, and algorithms described below, particularly with reference to FIGS. 5 to 12.

The foregoing examples of languages, environments, and code libraries are not intended to be limiting, and it will be appreciated that any convenient languages, libraries, and development systems may be employed, in accordance with system requirements. The descriptions, block diagrams, flowcharts, equations, and so forth, presented in this specification are provided, by way of example, to enable those skilled in the arts of software engineering and machine learning to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

Continuing the discussion of FIG. 1, the networked system 100 also includes a monitored system 118. By way of providing a concrete example in order to illustrate the principles of the invention, the monitored system 118 may be an online sales or e-commerce system. As is well-known, a user may employ a web browser, or other application software, in order to access the e-commerce system 118 via the Internet 116 from their own personal computer 120, or other suitable device. A user interaction with the e-commerce system 118 may typically involve a number of sequential events or actions, such as logging in, searching and/or browsing for items, selecting items, adding items to an electronic shopping cart, executing a checkout process (e.g., providing payment details, providing shipping details, and confirming purchase), and logging out. These exemplary events and actions are not intended to be limiting, and it will be appreciated that any online system, such as an e-commerce system 118, supports a specific finite (though possibly large) set of individual events and actions, and/or sequences of individual events and actions.

Figure 2:
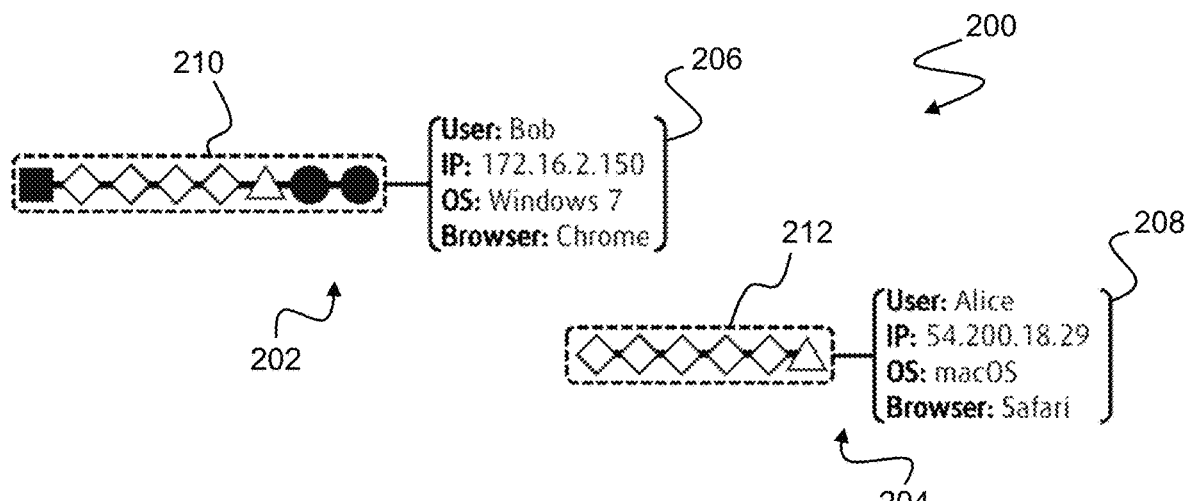
FIG. 2 is a schematic diagram illustrating data associated with user interactions with the e-commerce system of FIG. 1.

In this context, FIG. 2 is a schematic diagram 200 illustrating data associated with user interactions with the e-commerce system 118. Two exemplary data samples 202, 204 are shown, each of which is associated with a single interaction by a user with the e-commerce system 118. Each interaction has a number of associated attributes 206, 208 including, for example, the user's name or identifier, the IP address associated with the device, e.g., 120, used to access the system 118, the operating system of the device, and information about the web browser or other application software used to access the system 118. These attributes 206, 208 provide a form of 'fingerprint' of the user, device, and software. As will be appreciated, an interaction of a user with a web site may have alternative or additional attributes (not shown), such as the time of the interaction, and the geographical location of the user device. The selected attributes in any particular implementation comprise a data record having a known, fixed, size.

Each interaction also has an associated sequence 210, 212 of actions or events, such as those outlined above. In contrast to the attributes 206, 208, each sequence 210, 212 comprises a data record containing a variable number of items. Furthermore, the sequential ordering of items in the sequence is generally significant.

The term 'attributed sequence' is used throughout this specification to refer to any data sample, such as the e-commerce interaction data 202, 204, which comprises associated attribute and sequence records. More particularly, an attributed sequence $J_k$ comprising a fixed-length attribute vector $x_k$ and a variable-length sequence $S_k$ may be denoted $J_k=(x_k, S_k)$. In some circumstances it may be convenient to convert $S_k$ to a fixed-length representation, by determining the length T of the longest sequence in a set of sequences, and padding all shorter sequences to this length with null items.

Figure 3:
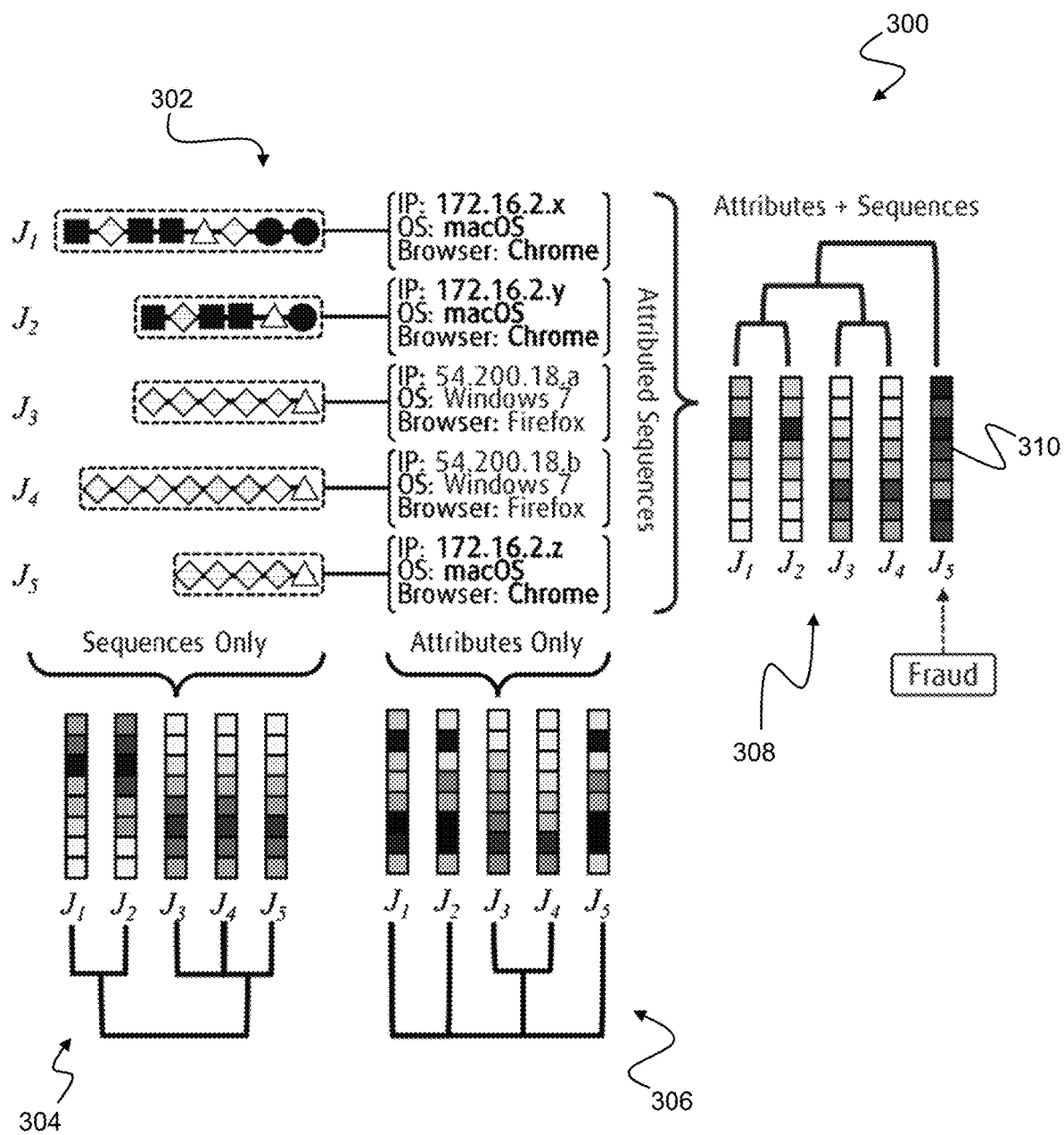
FIG. 3 is a schematic diagram illustrating the significance of attributed sequence data in the context of the fraud detection system of FIG. 1.

FIG. 3 is a schematic diagram 300 illustrating the significance of attributed sequence data in the context of the exemplary fraud detection application. Five attributed sequences 302 are shown, labeled $J_1$ to $J_5$. Embedding of the sequence data alone results in a set of feature vectors represented by the dendrogram 304, which signifies that sequences $J_1$ and $J_2$ are similar (i.e., separated by a relatively short distance measure in feature space), and that sequences $J_3$, $J_4$ and $J_5$ are similar. Thus no individual sequence stands out as an anomaly or outlier. Embedding of the attribute data alone results in a separate set of feature vectors represented by the dendrogram 306, which signifies that attribute records $J_1$, $J_2$ and $J_5$ are similar, and that attribute records $J_3$ and $J_4$ are similar. Again, no individual record stands out as an anomaly or outlier.

Figure 4:
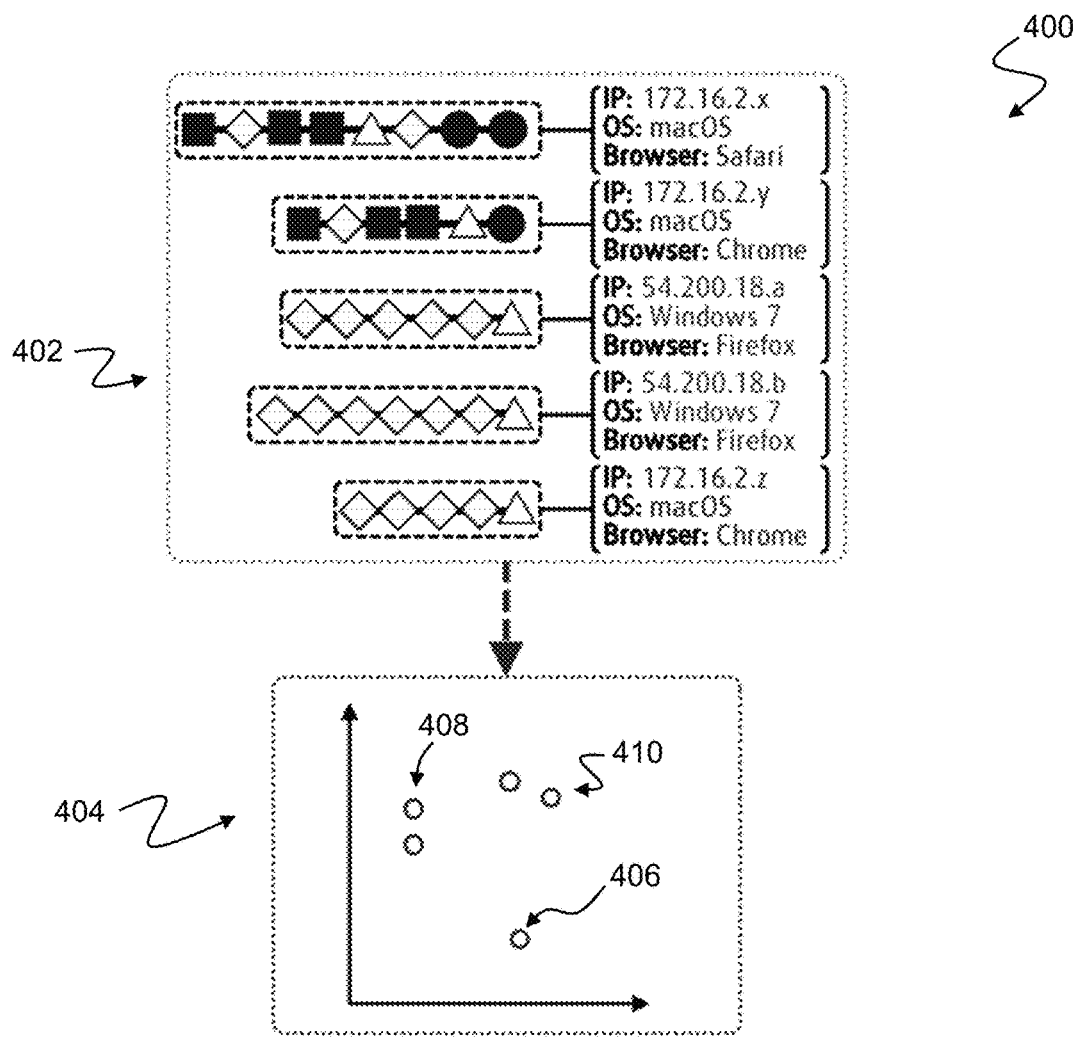
FIG. 4 is a schematic diagram showing a mapping of attributed sequences to an exemplary feature space.

The problem with an approach of treating the sequence data and attribute data separately is that, while this can account for dependencies between different items in a sequence and for dependencies between different elements in an attribute record, it does not account for dependencies between sequence data and attribute data. As illustrated by the dendrogram 308, once such heterogeneous dependencies are taken into account, it is possible that different groupings will emerge. For example, as shown, alternative feature vectors derived from attributed sequences may reveal that $J_1$ and $J_2$ are similar, that $J_3$ and $J_4$ are similar, and that $J_5$ maps to an embedding 310 that is quite different from all other feature vectors. This is further illustrated in FIG. 4, which is a schematic diagram 400 showing a mapping of attributed sequences 402 to a feature space 404 (limited to two dimensions/features for simplicity of illustration) wherein one of the attributed sequences 406 has an embedding that is relatively distant from the clusters 408, 410 corresponding with the other attributed sequences.

Thus, embedding of attributed sequences may result in the identification of anomalous data, even in cases for which a sequence embedding and attribute embedding considered separately do not. Such outliers 310 are significant, since they may represent fraudulent behavior that should be flagged by the fraud detection system 102. It is therefore necessary to generate an embedding of the attributed sequences that accounts for all three dependencies, i.e., the homogeneous dependencies within sequence and attribute data, and the heterogeneous dependencies between sequence and attribute data.

Embodiments of the invention generate such an embedding through a coupled combination of at least two machine learning modules. More particularly, in some embodiments of the invention, as described below with reference to FIGS. 5 to 10, an attribute network module is coupled to a sequence network module to provide a system configured to learn feature representations of attributed sequences in an unsupervised manner, i.e., in the absence of any labeled data identifying similar and/or dissimilar attributed sequences. In further embodiments of the invention, as described with reference to FIGS. 11 to 12, a third module, identified as a 'metric network', is additionally coupled to the attribute network module and the sequence network module to provide a system configured to learn feature representations of attributed sequences in a supervised, or semi-supervised, manner, i.e., by learning at least in part from data that has been labeled, e.g., by human experts, to identify similar and/or dissimilar attributed sequences.

In particular embodiments, as disclosed herein, the attribute network may be a fully-connected neural network configured to encode the fixed-length attribute data part of an attributed sequence using nonlinear transformations. The sequence network may be a Long Short-Term Memory (LSTM) network, i.e., a recurrent neural network, configured to encode structural information of the variable-length sequence data part of an attributed sequence into a fixed-length vector. The metric network may be a feedback module configured to generate gradient information in accordance with a loss function and learning objective based upon the labeled data that is back-propagated through the attribute and sequence networks.

Figure 5:
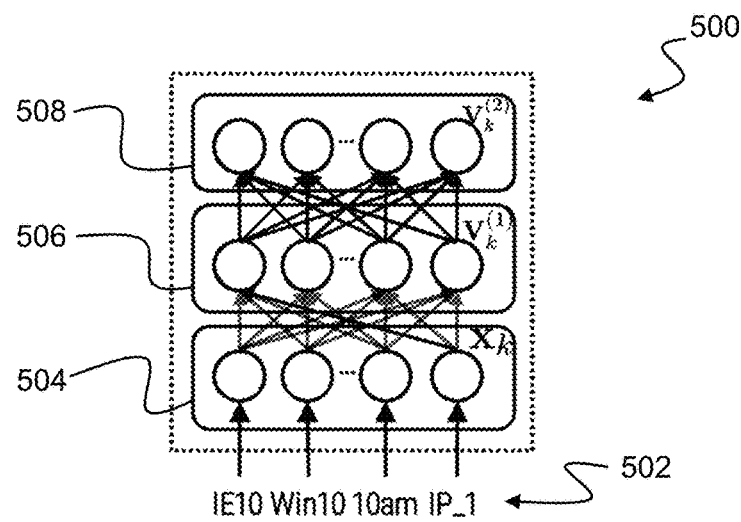
FIG. 5 is a schematic illustration of an attribute network according to an embodiment of the invention.

FIG. 5 is a schematic illustration of an attribute network 500 having a fixed number u of input attributes 502 comprising an input $x_k$, an input layer 504, and a plurality of further layers, e.g., 506, 508. In particular, an attribute network 500 may comprise M layers, with $d_m$ hidden units and corresponding output $V_k^{(m)}$ in the m-th layer (m=1 ... M). The structure of the attribute network 500 may then be represented as:

$$V_k^{(1)} = \delta(W_A^{(1)} x_k + b_A^{(1)}) \quad (1)$$
$$V_k^{(2)} = \delta(W_A^{(2)} V_k^{(1)} + b_A^{(2)})$$
$$\vdots$$
$$V_k^{(M)} = \delta(W_A^{(M)} V_k^{(M-1)} + b_A^{(M)})$$

In Equation (1) $\delta$ is a nonlinear activation function, e.g., sigmoid, ReLU or tan h, $W_A^{(m)}$ is a matrix of weight parameters, and $b_A^{(m)}$ is a vector of bias parameters. In the case of a system configured to learn feature representations of attributed sequences in an unsupervised manner, i.e., in the absence of any labeled data identifying similar and/or dissimilar attributed sequences, it is convenient to define an alternative network size parameter M' such that M=2M', and to define the structure of the attribute network 500 as:

$$V_k^{(1)} = \rho(W_A^{(1)} x_k + b_A^{(1)}) \quad (2)$$
$$\vdots$$
$$V_k^{(M')} = \rho(W_A^{(M')} x_k + b_A^{(M')} + b_A^{(M')})$$
$$V_k^{(M'+1)} = \sigma(W_A^{(M'+1)} V_k^{(M')} + b_A^{(M'+1)})$$
$$\vdots$$
$$\tilde{x}_k = \sigma(W_A^{(2M')} V_k^{(2M'-1)} + b_A^{(2M')})$$

In Equation (2), the activation functions $\rho$ and $\sigma$ may be the same, or different. In a particular embodiment, it has been found that using $\rho(z)=\text{ReLU}(z)$ and $\sigma(z)=\text{sigmoid}(z)$ performs better than using a single activation function. In the attribute network 500 with 2M' layers, as defined in Equation (2), there are two components: an encoder comprising the first M' layers, which generates a feature representation having $d_{M'}$ components; and a decoder comprising the further M' layers, which attempts to reconstruct the input, whereby $\tilde{x}_k$ is the reconstruction result.

The number of units $d_M$ in the output layer defined by $V_k^{(M)}$ in Equation (1) and, equivalently, the number of units $d_{M'}$ in the output layer defined by $V_k^{(M')}$ in Equation (2), is a parameter of the attribute network 500 that is determined at the time of design and/or configuration of the network 500, and is subsequently fixed during operation. This parameter thus comprises a first predetermined number that contributes to the particular embeddings of attributed sequence data generated by embodiments of the invention.

Figure 6:
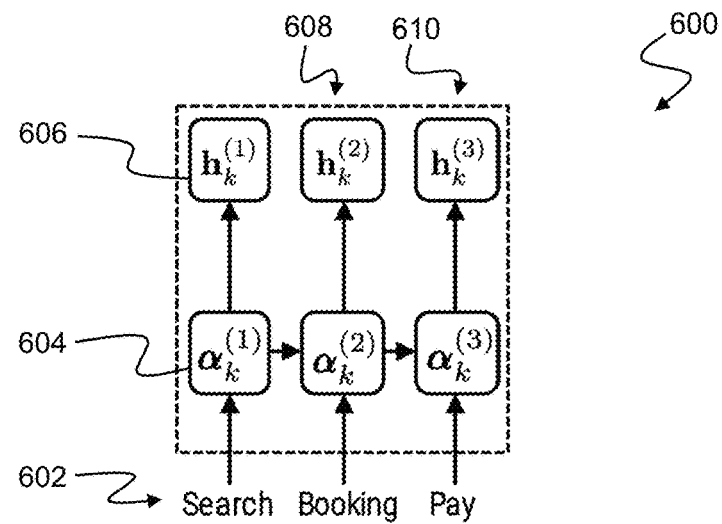
FIG. 6 is a schematic illustration of a sequence network according to an embodiment of the invention.

FIG. 6 is a schematic illustration of a sequence network 600. The sequence network 600 is a variation of the LSTM model. As will be appreciated by persons skilled in machine learning using neural networks, LSTM models are recurrent neural networks, i.e., they operate via internal feedback at each time step of evaluation. As is common, however, the sequence network 600 is represented in 'unrolled' form, whereby the inputs 602 represent sequential inputs transferred to the cells 604 of the network at each successive step, resulting in the generation of corresponding successive hidden states 606. The size of the sequence network (i.e., the number of hidden units) is designated $d_S$. The structure of the sequence network 600 may be represented as:

$$i_k^{(t)} = \sigma(W_i \vec{\alpha}_k^{(t)} + U_i h_k^{(t-1)} + b_i)$$

$$f_k^{(t)} = \sigma(W_f \vec{\alpha}_k^{(t)} + U_f h_k^{(t-1)} + b_f)$$

$$o_k^{(t)} = \sigma(W_o \vec{\alpha}_k^{(t)} + U_o h_k^{(t-1)} + b_o)$$

$$g_k^{(t)} = \tan h(W_c \vec{\alpha}_k^{(t)} + U_c h_k^{(t-1)} + b_c)$$

$$c_k^{(t)} = f_k^{(t)} \odot c_k^{(t-1)} + i_k^{(t)} \odot g_k^{(t)}$$

$$h_k^{(t)} = o_k^{(t)} \odot \tan h(c_k^{(t)}) \quad (3)$$

In Equation (3), $\vec{\alpha}_k^{(t)}$ represents a categorical item in the sequence $S_k$ at time t; $\sigma$ is a sigmoid gating function; $i_k^{(t)}$, $f_k^{(t)}$, $o_k^{(t)}$, and $g_k^{(t)}$ are the internal gates; $c_k^{(t)}$ are the cell states, $h_k^{(t)}$ are the hidden states (all being represented as length-$d_S$ vectors); $W_i$, $W_f$, $W_o$, $W_c$, $U_i$, $U_f$, $U_o$, and $U_c$ are weight matrices; and $b_i$, $b_f$, $b_o$, and $b_c$ are bias vectors. The operator $\odot$ denotes element-wise multiplication.

An output of the sequence network 600 can then be defined as:

$$y_k^{(t)} = \mathrm{softmax}(W_y h_k^{(t)} + b_y) \quad (4)$$

In Equation (4) $W_y$ is a weight matrix, and $b_y$ a bias vector. The quantity $y_k^{(t)}$ is a vector having a length r equal to the number of distinct items from which the input sequence is selected, and which may be interpreted as a probability distribution over the r items that can be used to predict the next item in the input sequence.

The number of hidden units $d_S$ is a parameter of the sequence network 600 that is determined at the time of design and/or configuration of the network 600, and is subsequently fixed during operation. This parameter thus comprises a second predetermined number that contributes to the particular embeddings of attributed sequence data generated by embodiments of the invention.

Figure 7:
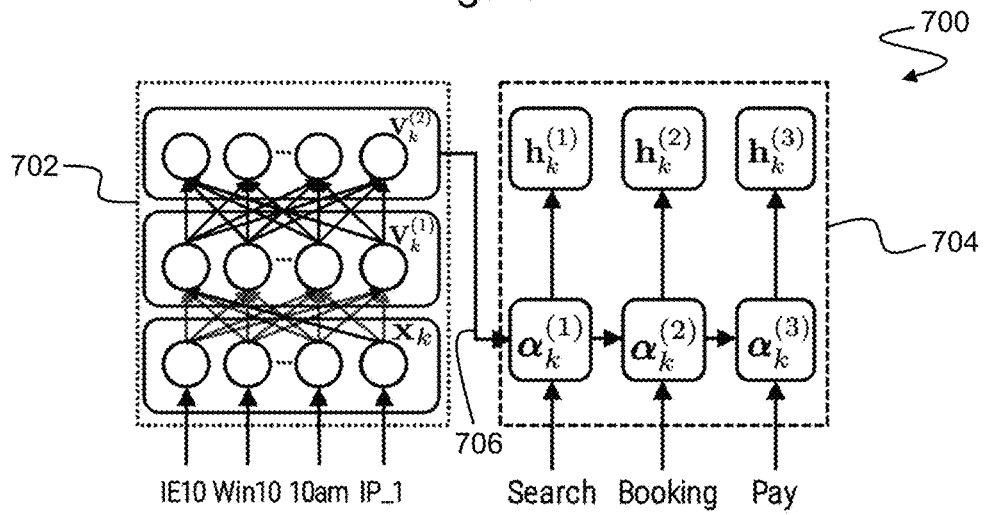
FIG. 7 illustrates an attribute-network-first coupling according to an embodiment of the invention.

In order to generate embeddings for attributed sequences, embodiments of the invention employ couplings between an attribute network 500 and sequence network 600. FIG. 7 illustrates an attribute-network-first coupling 700, in which an attribute network 702 is coupled to a sequence network 704 via a connection 706 that transfers an output of the attribute network 702 to an input of the sequence network 704. In the case of an unsupervised system, i.e., as described by Equation (2), the output of the M'-th layer of the attribute network 702 is coupled to the hidden states of the sequence network 704 at the first step, i.e., by modifying Equation (3) according to:

$$h_k^{(t)} = o_k^{(t)} \odot \tan h(c_k^{(t)}) + \mathbb{1}(t=1) \odot V_k^{(M')} \quad (5).$$

In the case of a supervised system, i.e., as described by Equation (1), an analogous modification may be made, replacing M' in Equation (5) with M. For this coupling to work, the number of hidden units in the coupled layer of the attribute network, $d_{M'}$ (or $d_M$) must be equal to the number of hidden units in the sequence network, $d_S$. Both of these values are design parameters of the networks. The embedding, i.e., fixed-length feature representation, of an attributed sequence $J_k = (x_k, S_k)$, with sequence length $l_k$, is then taken as the cell state $c_k^{(l_k)}$ of the sequence network 704 after processing of the last time step in the sequence.

Figure 8:
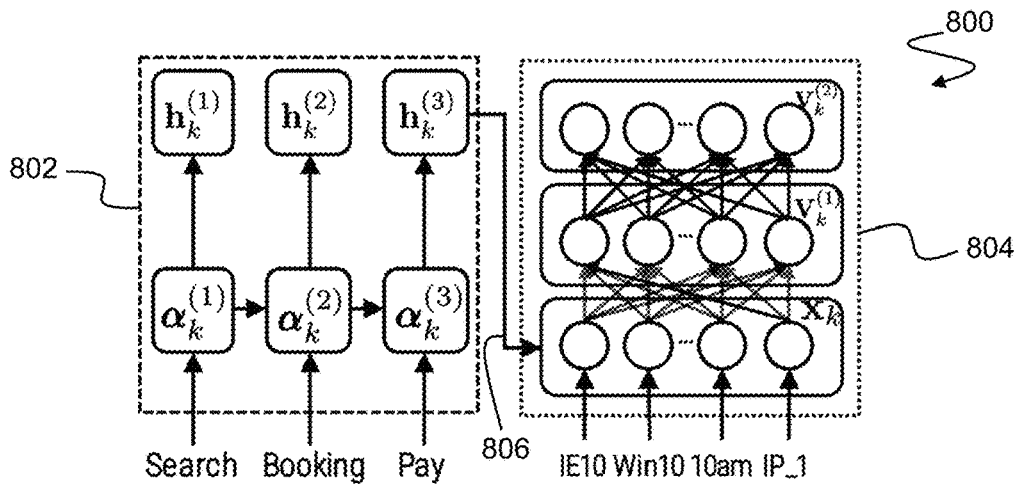
FIG. 8 illustrates a sequence-network-first coupling according to an embodiment of the invention.

FIG. 8 illustrates a sequence-network-first coupling 800, in which a sequence network 802 is coupled to an attribute network 804 via a connection 806 that transfers an output of the sequence network 802 to an input of the attribute network 804. The coupling may be effected by concatenating the hidden state $h_k^{(l_k)}$ of the sequence network 802 after processing of the last time step with the attribute data $x_k$, i.e., by modifying Equations (1) and (2) according to:

$$V_k^{(l)} = \delta(W_A^{(l)}(x_k \oplus h_k^{(l_k)}) + b_A^{(l)}) \quad (9)$$

where $\oplus$ is the concatenation operator.

Figure 9:
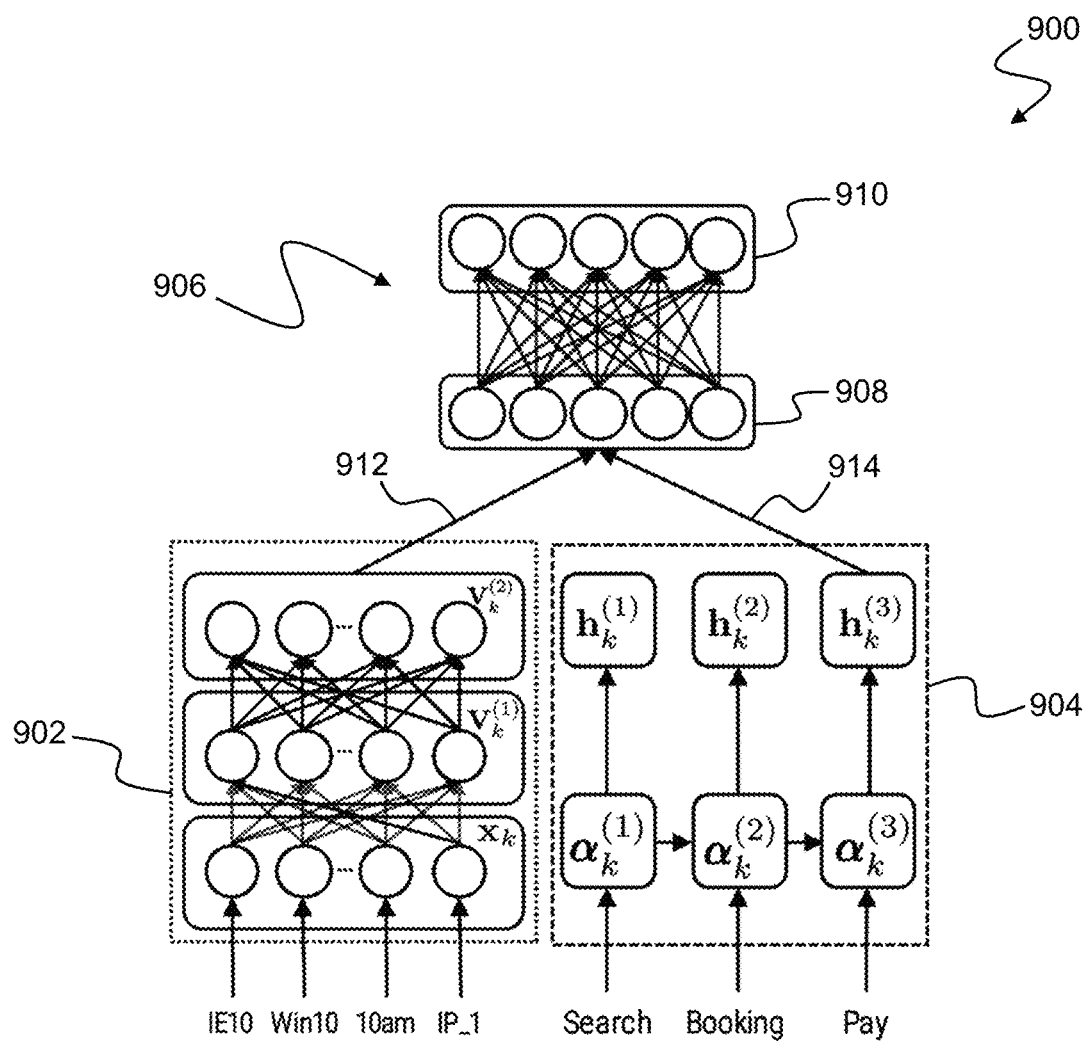
FIG. 9 illustrates a balanced coupling according to an embodiment of the invention.

FIG. 9 illustrates a balanced coupling 900, in which an attribute network 902 and a sequence network 904 are coupled to a fusion network 906 comprising a concatenation layer 908 and a fully-connected layer 910 implementing a nonlinear function over the concatenation to capture the dependencies between attributes and sequences. In the case of an unsupervised system, i.e., as described by Equation (2), the output $V_k^{(M')}$ of the M'-th layer of the attribute network 902 is coupled to the concatenation layer 908 via a connection 912, and the hidden state $h_k^{(l_k)}$ of the sequence network 904 after processing of the last time step is coupled to the concatenation layer 908 via a connection 914. With $y_k$ as the output of the concatenation layer 908, and $z_k$ as the output of the fully-connected layer 910 with weight matrix $W_z$ and bias vector $b_z$, this may be represented as:

$$y_k = V_k^{(M')} \oplus h_k^{(l_k)}$$

$$z_k = \delta(W_z y_k + b_z) \quad (7)$$

Figure 10:
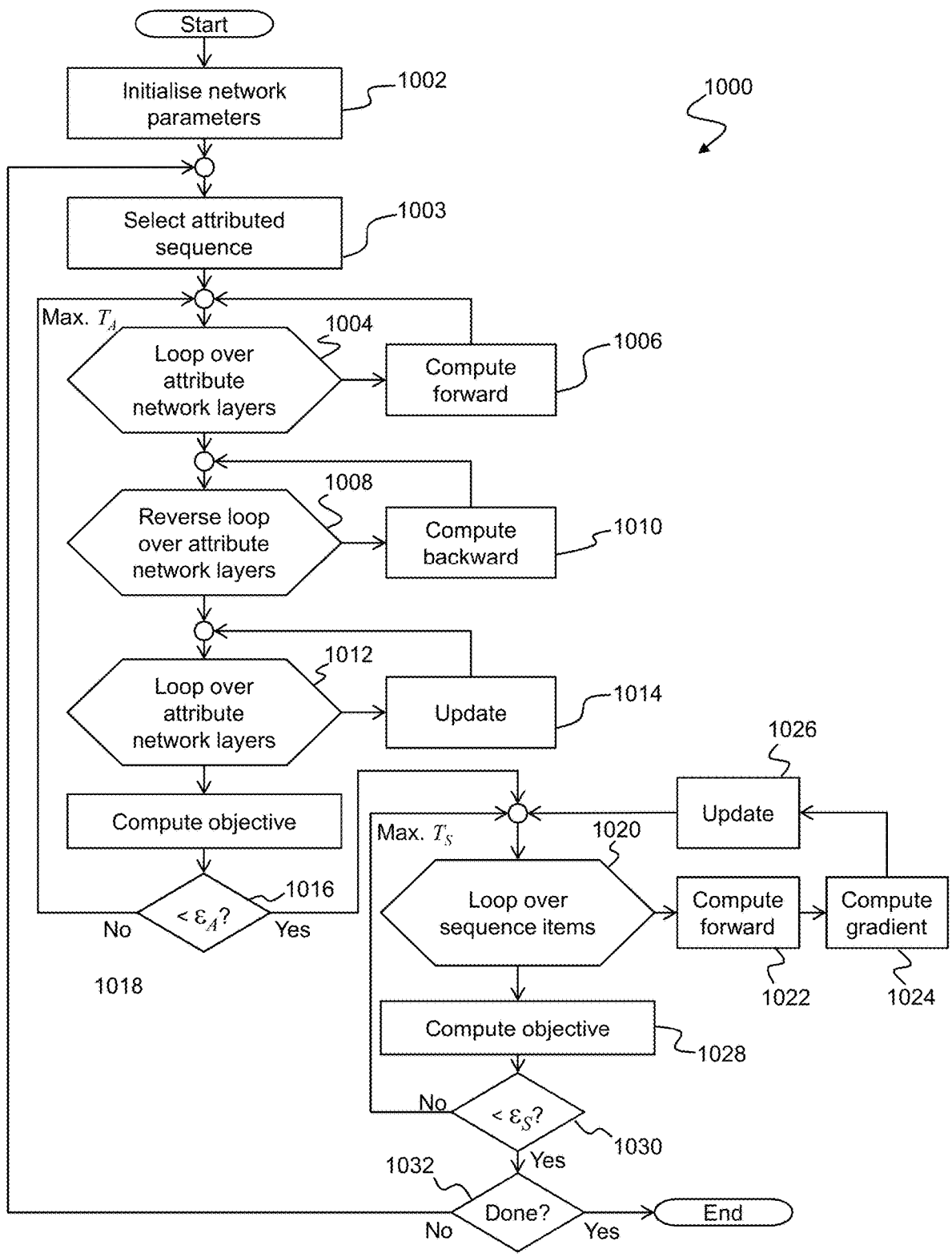
FIG. 10 is a flowchart illustrating an exemplary algorithm for unsupervised learning of an embedding for attributed sequences using an attribute-network-first coupling according to an embodiment of the invention.

FIG. 10 is a flowchart 1000 illustrating an exemplary algorithm for unsupervised learning of an embedding for attributed sequences using an attribute-network-first coupling 700. From the following description, persons skilled in the art will readily appreciate the modifications necessary to apply the algorithm in the cases of sequence-network-first coupling 800, and balanced coupling 900. The algorithm makes use of the following definitions of network parameters:

$$W_A = (W_A^{(1)}, \ldots, W_A^{(M')})$$

$$b_A = (b_A^{(1)}, \ldots, b_A^{(M')})$$

$$\phi_A = \{W_A, b_A\} \quad (8)$$

$$W_S = (W_i, W_f, W_o, W_c)$$

$$U_S = (U_i, U_f, U_o, U_c)$$

$$b_S = (b_i, b_f, b_o, b_c)$$

$$\phi_S = \{W_S, U_S, b_S, W_y, b_y\} \quad (9)$$

The attribute network 702 aims to minimise the differences between the input and reconstructed attribute values. The learning objective function of attribute network 702 is defined as:

$$L_A = \|x_k - \widehat{x}_k\|_2^2 \quad (10)$$

The sequence network 704 aims to minimise log likelihood of incorrect prediction of the next item at each time step. Thus, the sequence network 704 learning objective function can be formulated using categorical cross-entropy as:

$$L_S = -\sum_{t=1}^{l_k} \vec{a}_k^{(t)} \log y_k^{(t)} \quad (11)$$

The learning processes are composed of a number of iterations, and the parameters are updated during each iteration based on the gradient computed. $L_A^\tau$ and $L_S^\tau$ denote the $\tau$-th iteration of attribute network and sequence network, respectively. Target convergence errors between iterations for $L_A^\tau$ and $L_S^\tau$ are defined as $\varepsilon_A$ and $\varepsilon_S$ respectively. The maximum numbers of iterations for the attribute network and sequence network as $T_A$ and $T_S$. $T_A$ and $T_S$ are not necessarily equal because the number of iterations needed for attribute network and sequence network may not be the same. Following the attributed sequence learning process, the resulting learned parameters of the attribute network 702 and sequence network 704 may be used to embed each attributed sequence.

Returning to the flowchart 1000, at step 1002 the parameter vectors $\varphi_A$ and $\varphi_S$ are initialised, e.g., with random values selected from a uniform distribution. Learning commences at step 1003, with selection of an initial attributed sequence $J_1$. Using the attribute data part of the attributed sequence as input, loop 1004 loops over each of the 2M' attribute network layers, computing forward propagation 1006 through the attribute network 702. Loop 1008 then loops in reverse over each of the 2M' attribute network layers, computing gradients 1008 via backward propagation. Loop 1012 loops back over the attribute network updating 1014 the network parameters $\varphi_A$. At step 1016 the learning objective function is computed in accordance with Equation (10). On second and subsequent loops through the learning procedure, this is compared with the value at the previous iteration to determine whether convergence has been reached (i.e., difference less than $\varepsilon_A$). If so, or if the maximum number of iterations $T_A$ has been reached, then the algorithm proceeds to sequence network training. Otherwise control returns to loop 1004 for a further iteration.

Using the sequence data part of the attributed sequence, and the output of layer M' of the attribute network 702, as inputs, loop 1020 loops over all items in the current sequence. The loop computes forward propagation 1022 to obtain output $y_k^{(t)}$ (see Equation (4)), computes the gradients 1024 of the sequence network, and updates 1026 the network parameters $\varphi_S$ at each time step. At step 1028 the learning objective function is computed in accordance with Equation (11). On second and subsequent loops through the learning procedure, this is compared with the value at the previous iteration to determine whether convergence has been reached (i.e., difference less than $\varepsilon_S$). If so, or if the maximum number of iterations $T_S$ has been reached, then the sequence training loop terminates. Otherwise control returns to loop 1020 for a further iteration.

At step 1032, the algorithm checks whether there are further attributed sequences $J_k$. If so, then control returns to step 1003 and a further attributed sequence is selected. Otherwise, the algorithm terminates.

Figure 11:
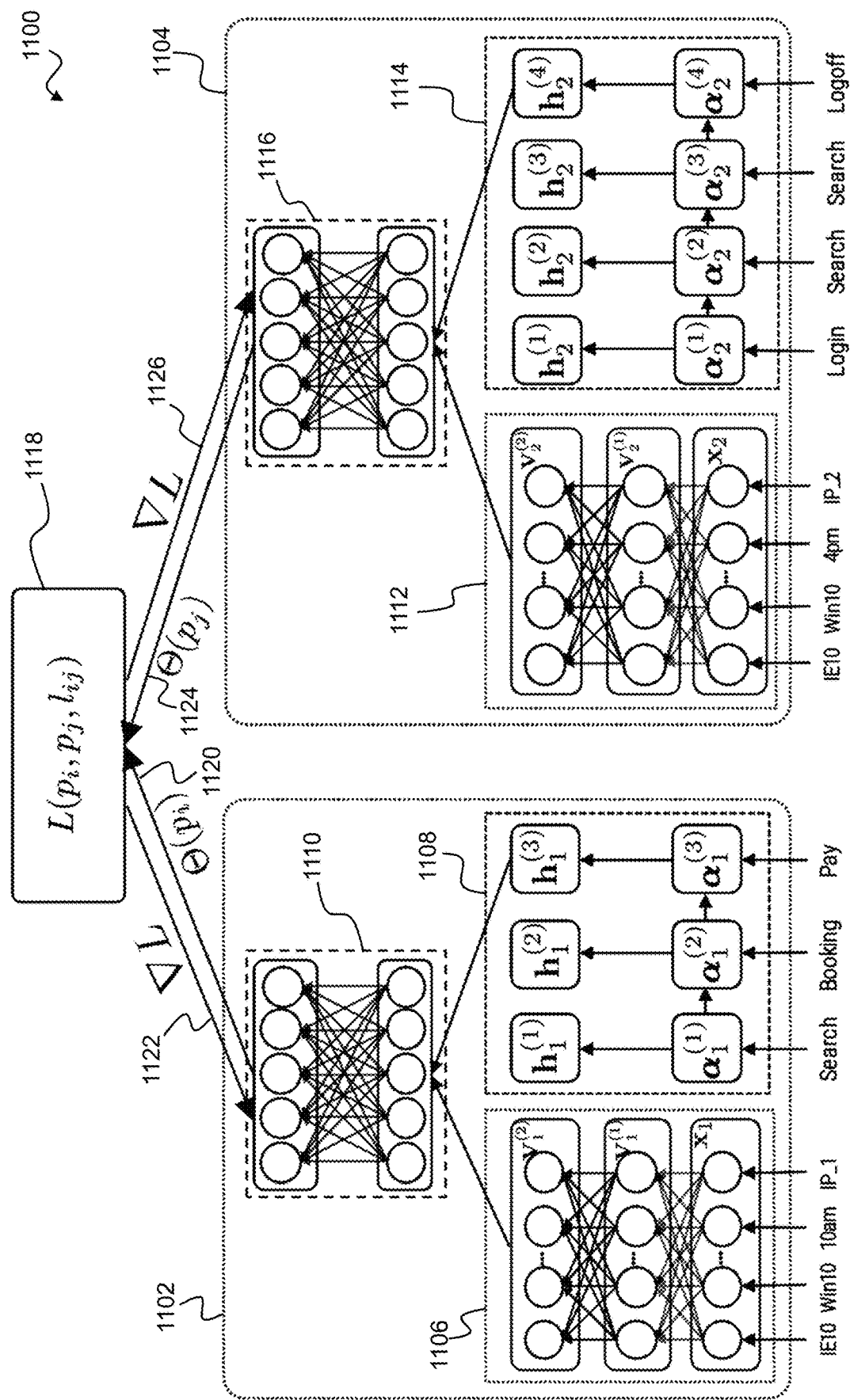
FIG. 11 is a schematic diagram illustrating a supervised distance metric learning system according to an embodiment of the invention.

FIG. 11 is a schematic diagram illustrating a supervised distance metric learning system 1100 for generating an embedding of attributed sequences. The system 1100 may be employed when feedback (i.e., labeled training data) is available, e.g., on the basis of manual identification by persons having suitable expertise. In particular, a feedback item may be defined as a triplet $(p_i, p_j, l_{ij})$ in which $p_i$ and $p_j$ are distinct attributed sequences drawn from a set $\{J_1, \ldots, J_n\}$ and $l_{ij}$ is a label indicating whether $p_i$ and $p_j$ are similar ($l_{ij}=1$) or dissimilar ($l_{ij}=0$). It is thus possible to define a similar feedback set $S=\{(p_i, p_j, l_{ij})|l_{ij}=1\}$ and a dissimilar feedback set $D=\{(p_i, p_j, l_{ij})|l_{ij}=0\}$. The objective of the system 1100 is then to learn an embedding of the attributed sequences which, under a predetermined distance metric, results in attributed sequences in the similar feedback set being 'more closely spaced', and in attributed sequences in the dissimilar feedback set being 'less closely spaced' (under suitable definitions of these terms).

Concretely, given a nonlinear transformation function $\Theta$ that generates an embedding of attributed sequences $p_i$ and $p_j$, and a distance metric $D_\Theta(p_i, p_j)$, the learning objective of the system 1100 may be defined as:

$$\text{minimize}_\Theta \sum_{(p_i, p_j, l_{ij}) \in S} D_\Theta(p_i, p_j) \quad (12)$$

$$\text{s.t.} \sum_{(p_i, p_j, l_{ij}) \in D} D_\Theta(p_i, p_j) \geq g$$

In Equation (12), g is a group-based margin parameter that stipulates the distance between two attributed sequences from dissimilar feedback set should be larger than g. This prevents the dataset from being reduced to a single point. As will be appreciated by persons skilled in the art of deep metric learning, a common approach is to employ the Mahalanobis distance function:

$$D_\Theta(p_i, p_j) = \sqrt{(\Theta(p_i) - \Theta(p_j))^T \Lambda (\Theta(p_i) - \Theta(p_j))} \quad (13)$$

In Equation (13), $\Lambda$ is a symmetric, semi-definite, and positive matrix. When $\Lambda = I$, Equation (13) is transformed to Euclidean distance as:

$$D_\Theta(p_i, p_j) = \|\Theta(p_i) - \Theta(p_j)\|_2. \quad (14)$$

As will be appreciated, the nonlinear transformation function $\Theta$ that generates an embedding of attributed sequences $p_i$ and $p_j$ may be defined by any one of the coupled network structures 700, 800, 900 described above. By way of a specific example, the system 1100 employs the balanced network structure 900, and comprises two such balanced networks 1102, 1104. Each of these includes an attribute network 1106, 1112, a sequence network 1108, 1114, and a fusion network 1110, 1116, wherein the nonlinear transformation function $\Theta$ may be defined as $\Theta(p_k) = \Theta_A(\Theta_A(x_k) \oplus \Theta_S(S_k))$. The two balanced networks 1102, 1104 are identical, and are used to generate embeddings $\Theta(p_i)$ and $\Theta(p_j)$ respectively. As will be appreciated, since the two networks 1102, 1104 are identical, in alternative embodiments a single network may be employed to generate the embeddings $\Theta(p_i)$ and $\Theta(p_j)$ sequentially, however a parallel implementation, in which $\Theta(p_i)$ and $\Theta(p_j)$ are computed simultaneously, is more efficient in the common case that sufficient multiprocessing resources are available. A further metric network 1118 is coupled to the balanced networks 1102, 1104 to receive the encoded attributed sequences via connections 1120, 1124, and propagate learning information (i.e., gradients) back to the networks via connections 1122, 1126.

The metric network 1118 is designed using a contrastive loss function so that attributed sequences in each similar pair in S have a smaller distance compared to those in D after learning the distance metric. In a specific embodiment, the metric network 1118 computes the Euclidean distance between each pair using the labels and back-propagates the gradients through all components in the networks 1102, 1104. The learning objective of the metric network can be written as:

$$L(p_i, p_j, l_{ij}) = \frac{1}{2}(1 - l_{ij})(D_\Theta)^2 + \frac{1}{2} l_{ij} \{\max(0, g - D_\Theta)\}^2 \quad (15)$$

For a learning rate $\gamma$, the parameters $W_A$, $W_S$, $U_S$, $b_A$ and $b_S$ can be updated using the following equations, until convergence:

$$W_A = W_A - \gamma \frac{\partial L}{\partial W_A} \quad (16)$$

$$b_A = b_A - \gamma \frac{\partial L}{\partial b_A}$$

$$W_S = W_S - \gamma \frac{\partial L}{\partial W_S}$$

$$U_S = U_S - \gamma \frac{\partial L}{\partial U_S}$$

$$b_S = b_S - \gamma \frac{\partial L}{\partial b_S}$$

To enable these updates to be performed, the gradients to be computed and back-propagated by the metric network 1118 can be determined using the following equations:

$$\nabla L = \left[ \frac{\partial L}{\partial W_A}, \frac{\partial L}{\partial b_A}, \frac{\partial L}{\partial W_S}, \frac{\partial L}{\partial U_S}, \frac{\partial L}{\partial b_S} \right] \quad (17)$$

$$\nabla L = \frac{\partial L}{\partial D_\Theta} \frac{\partial D_\Theta}{\partial \Theta} \left[ \frac{\partial V_k^{(M)}}{\partial W_A}, \frac{\partial V_k^{(M)}}{\partial b_A}, \frac{\partial h_k^{(T_k)}}{\partial W_S}, \frac{\partial h_k^{(T_k)}}{\partial U_S}, \frac{\partial h_k^{(T_k)}}{\partial b_S} \right] \quad (18)$$

$$\frac{\partial L}{\partial D_\Theta} = (1 - \ell_{ij}) D_\Theta - \ell_{ij} \max(0, g - D_\Theta) \quad (19)$$

$$\frac{\partial D_\Theta}{\partial \Theta} = (\Theta(p_i) - \Theta(p_j)) \cdot (1 - (\Theta(p_i) - \Theta(p_j))) \quad (20)$$

For the $m^{th}$ layer of the attribute networks, the update equations are then given by:

$$\frac{\partial V_k^{(m)}}{\partial W_A^{(m)}} = V_k^{(m)}(1 - V_k^{(m)}) V_k^{(m-1)} \quad (21)$$

$$\frac{\partial V_k^{(m)}}{\partial b_A^{(m)}} = V_k^{(m)}(1 - V_k^{(m)})$$

In deriving the update equations for the sequence networks, it is convenient to denote $\Delta_t = (\Delta_{it}, \Delta_{ft}, \Delta_{ot}, \Delta_{ct})$ the components of which may be written using implicit differentiation equations as:

$$\Delta_{it} = o_k^{(t)} \odot ((1 - \tan h^2(c_k^{(t)})) i_k^t (1 - i_k^{(t)}) z_k^{(t)}) \odot g_k^{(t)}$$

$$\Delta_{ft} = o_k^{(t)} \odot ((1 - \tan h^2(c_k^{(t)})) f_k^t (1 - f_k^{(t)}) z_k^{(t)})) \odot c_k^{(t-1)}$$

$$\Delta_{ot} = o_k^{(t)} (1 - o_k^{(t)}) z_k^{(t)} \odot \tan h(c_k^{(t)})$$

$$\Delta_{ct} = o_k^{(t)} \odot ((1 - \tan h^2(c_k^{(t)})) i_k^{(t)} \odot (1 - \tan h^2(g_k^{(t)})) z_k^{(t)}) \quad (22)$$

By substituting the appropriate parameters for $z_k^{(t)}$ in Equation (22), the update equations for the sequence networks at time step t are given by:

$$\frac{\partial h_k^{(t)}}{\partial W_S} = \Delta_t, \text{ with } z_k^{(t)} = \vec{a}_k^{(t)} \quad (23)$$

$$\frac{\partial h_k^{(t)}}{\partial U_S} = \Delta_t, \text{ with } z_k^{(t)} = h_k^{(t-1)}$$

$$\frac{\partial h_k^{(t)}}{\partial b_S} = \Delta_t, \text{ with } z_k^{(t)} = I$$

where I is an identity matrix of appropriate dimension.

Initialisation of the parameters can be important when using gradient descent methods during training of the networks. In an embodiment of the invention, weight matrices $W_A$ in $\Theta_A$ and the $W_S$ in $\Theta_S$ are initialised using a uniform distribution method, and the biases $b_A$ and $b_S$ are initialized with zero vector 0. The recurrent matrix $U_S$ is initialized using an orthogonal matrix. With $d_m$ as the output dimension of the m-th layer and $d_S$ as the output dimension of $\Theta_S$, the weights of the m-th layer in $\Theta_A$ and $W_S$ in $\Theta_S$ are initialized as:

$$W_A^{(m)} \sim \text{Uniform}\left[ -\frac{\sqrt{6}}{\sqrt{d_{m-1} + d_m}}, \frac{\sqrt{6}}{\sqrt{d_{m-1} + d_m}} \right]$$

$$W_{\theta_S} \sim \text{Uniform}\left[ -\sqrt{\frac{6}{d_S}}, \sqrt{\frac{6}{d_S}} \right]$$

In embodiments of the invention, $l_2$-regularisation has been used, in combination with an early-stopping strategy to prevent overfitting.

Figure 12:
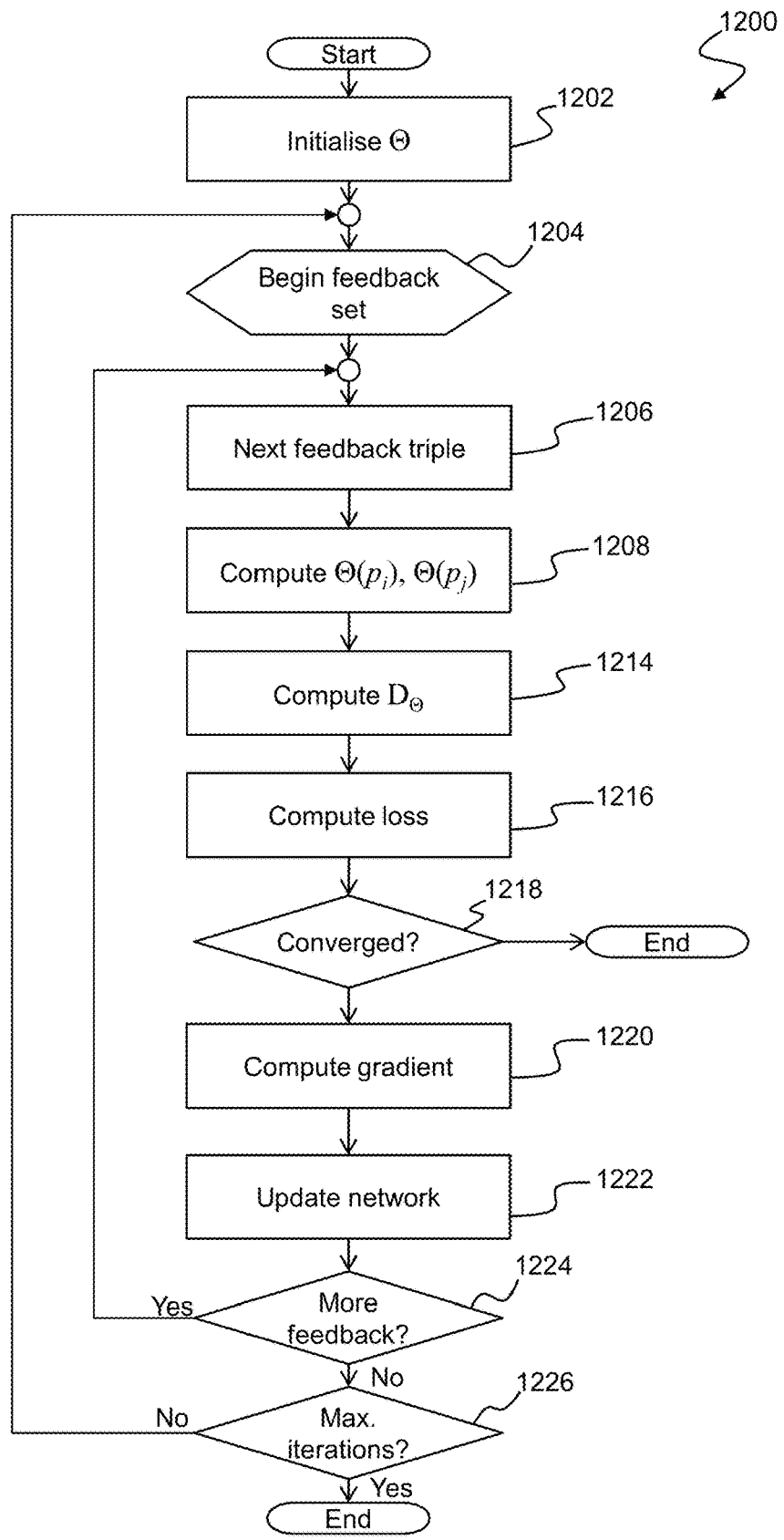
FIG. 12 is a flowchart illustrating an exemplary algorithm for supervised distance metric learning according to an embodiment of the invention.

FIG. 12 is a flowchart 1200 illustrating an exemplary algorithm for supervised distance metric learning for attributed sequences using the balanced network structure 1100. At step 1202, the network parameters are initialised, for example using the methods described above. At step 1204, the algorithm resets to draw from the beginning of the feedback set $\{J_1, \ldots, J_n\}$, and at step 1206 the next (initially the first) feedback triple is drawn from the set. At step 1208, the embeddings $\Theta(p_i)$ and $\Theta(p_j)$ are computed. At step 1214, $D_\Theta$ is computed using Equation (14), and then the loss is computed according to Equation (15) at step 1216. A check for convergence is made at step 1218 (e.g., by comparing the computed loss with the loss at the previous iteration, and determining whether it is within a defined convergence error E). If convergence has occurred, then the algorithm terminates, otherwise the gradients are computed at step 1220 using Equations (17) to (23), and the network is updated at step 1222 using Equation (16). A check is then performed at step 1224 to determine whether there are more feedback items available, and if so then control returns to step 1206. Otherwise control passes to step 1226 when a check is performed to determine whether a maximum number of iterations has been reached. If not, then control returns to step 1204 and another pass is conducted over the feedback set. Otherwise, the algorithm terminates.

Mining tasks over sequential data, such as clickstreams and gene sequences, require a careful design of feature representations usable by learning algorithms. Many real-world applications involve attributed sequences, in which each instance is composed of both a sequence of categorical items and a set of attributes. Advantageously, embodiments of the invention disclosed herein are able to learn the representations of attributed sequences in either an unsupervised or supervised fashion. Obtaining such representations is core to many important data mining tasks ranging from to user behavior analysis to clustering of gene sequences. The embeddings generated by embodiments of the invention are task independent and can be used on various mining tasks of attributed sequences.

An exemplary system employing an embodiment of the invention for fraud detection has also been disclosed. Such a system is able to learn embeddings for sequences of user actions in combination with associated attributes, such that 'normal', or common, behaviors are represented by clusters in points in feature space, while uncommon, abnormal, or outlying behaviors may be identified as more distant or isolated points.

Embodiments of the invention comprising supervised learning capabilities have been disclosed, which employ a deep learning framework to learn a distance metric that effectively measures the similarity and dissimilarity between attributed sequences.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. In general, embodiments of the invention rely upon providing technical arrangements whereby embeddings, or feature representations, of attributed sequences may be learned autonomously, using a coupled combination of at least two machine learning modules. In some such technical arrangements, an attribute network module is coupled to a sequence network module to provide a system configured to learn feature representations of attributed sequences in an unsupervised manner, i.e., in the absence of any labeled data identifying similar and/or dissimilar attributed sequences. In other such technical arrangements a third module is additionally coupled to the attribute network module and the sequence network module to provide a system configured to learn feature representations of attributed sequences in a supervised, or semi-supervised, manner, i.e., by learning at least in part from data that has been labeled, e.g., by human experts, to identify similar and/or dissimilar attributed sequences.

Accordingly, the described embodiments should be understood as being provided by way of example, for the purpose of teaching the general features and principles of the invention, but should not be understood as limiting the scope of the invention, which is as defined in the appended claims.

What is claimed is:

1. A machine learning system for embedding attributed sequence data comprising an attribute data part having a fixed number of attribute data elements and a sequence data part having a variable number of sequence data elements into a fixed-length feature representation for a fraud detection system, wherein the machine learning system comprises a multilayer feedforward neural network having an attribute data input layer and an attribute vector output layer which comprises a first predetermined number of units, operatively coupled to a long short-term memory (LSTM) network which comprises a second predetermined number of hidden units which is equal to the first predetermined number of units, wherein an output of the attribute vector output layer is operatively coupled to an input of an attribute vector input layer of the LSTM network, and wherein the attribute vector input layer of the LSTM network comprises a hidden state of the LSTM network at a first evaluation step, the machine learning system comprising:
a computing device; and
a computer-readable storage medium comprising a set of instructions that upon execution by the computing device cause the machine learning system to:
obtain a dataset comprising a plurality of attributed sequences based on user behavior associated with user actions; and
for each attributed sequence in the dataset,
train the multilayer feedforward neural network using the attribute data part of the attributed sequence via back-propagation with respect to a first objective function, and
train the LSTM network using the sequence data part of the attributed sequence via back-propagation with respect to a second objective function,
wherein training of the multilayer feedforward neural network is coupled with training the LSTM network such that, in use, the machine learning system is configured to:
identify common behaviors based on clusters in points in feature space;
determine a fixed-length feature representation of input attributed sequence data based on an analysis of the user behavior associated with the user actions within the fraud detection system that includes the identified common behaviors, wherein the fixed-length feature representation of input attributed sequence data comprises the hidden state of the LSTM network at a final evaluation step;
identify potential fraudulent behaviors based on isolated points within the fixed-length feature representation; and
output the fixed-length feature representation which encodes: i) dependencies between different attribute data elements in the attribute data part, ii) dependencies between different sequence data elements in the sequence data part, and iii) dependencies between attribute data elements and sequence data elements within the attributed sequence data.

2. The machine learning system of claim 1 wherein the LSTM network comprises a recurrent neural network.

3. The machine learning system of claim 1 wherein the set of instructions that upon execution by the computing device further cause the machine learning system to:
learn a nonlinear function of a concatenation which encodes dependencies between attribute data elements and sequence data elements within the attributed sequence data.

4. A training method of a machine learning system for embedding attributed sequence data comprising an attribute data part having a fixed number of attribute data elements and a sequence data part having a variable number of sequence data elements into a fixed-length feature representation for a fraud detection system, wherein:
the machine learning system comprises a multilayer feedforward neural network having an attribute data input layer and an attribute vector output layer which comprises a first predetermined number of units, operatively coupled to a long short-term memory (LSTM) network which comprises a second predetermined number of hidden units, an output of the attribute vector output layer is operatively coupled to an input of an attribute vector input layer of the LSTM network, the attribute vector input layer of the LSTM network comprises a hidden state of the LSTM network at a first evaluation step, and the first predetermined number of units of the attribute vector output layer is equal to the second predetermined number of hidden units, the training method comprising:

obtaining a dataset comprising a plurality of attributed sequences based on user behavior associated with user actions; and for each attributed sequence in the dataset,
training the multilayer feedforward neural network using the attribute data part of the attributed sequence via back-propagation with respect to a first objective function, and
training the LSTM network using the sequence data part of the attributed sequence via back-propagation with respect to a second objective function, wherein training of the multilayer feedforward neural network is coupled with training the LSTM network such that, in use, the machine learning system is configured to:
identify common behaviors based on clusters in points in feature space;
determine a fixed-length feature representation of input attributed sequence data based on an analysis of the user behavior associated with the user actions within the fraud detection system that includes the identified common behaviors, wherein the fixed-length feature representation of input attributed sequence data comprises the hidden state of the LSTM network at a final evaluation step;
identify potential fraudulent behaviors based on isolated points within the fixed-length feature representation; and
output a fixed-length feature representation of input attributed sequence data which encodes: i) dependencies between different attribute data elements in the attribute data part, ii) dependencies between different sequence data elements in the sequence data part, and iii) dependencies between attribute data elements and sequence data elements within the attributed sequence data.

5. The training method of claim 4 wherein the LSTM network comprises a recurrent neural network.

6. The training method of claim 4 wherein the multilayer feedforward neural network comprises:
an encoder having an encoder input layer which comprises the attribute data input layer and an encoder output layer which comprises the attribute vector output layer; and
a decoder having a decoder input layer coupled to the encoder output layer, and a decoder output layer which comprises a reconstructed estimate of an input to the encoder input layer,
and wherein:
the first objective function comprises a distance measure between the input to the encoder input layer and the reconstructed estimate, and
training the multilayer feedforward neural network comprises:
iteratively performing steps of forward- and back-propagation with the attribute data part of the attributed sequence as input to the encoder input layer until the distance measure satisfies a first convergence target.

7. The training method of claim 6 wherein the second objective function comprises a likelihood measure of incorrect prediction of a next sequence item at each one of a plurality of training time steps of the LSTM network, and training the LSTM network comprises:
iteratively repeating the plurality of training time steps until the likelihood measure satisfies a second convergence target, each iteration comprising:
at a first training time step, copying the output of the attribute vector output layer to the hidden state of the LSTM network; and
at a final training time step, computing the likelihood measure.

8. The training method of claim 7 wherein the distance measure comprises a mean-squared-error loss function and the likelihood measure comprises a categorical cross-entropy loss function.

9. A computer program product comprising:
a non-transitory computer readable storage medium; and
instructions stored on the non-transitory computer readable storage medium that provide a training method of a machine learning system for embedding attributed sequence data comprising an attribute data part having a fixed number of attribute data elements and a sequence data part having a variable number of sequence data elements into a fixed-length feature representation for a fraud detection system, wherein the machine learning system comprises a multilayer feedforward neural network having an attribute data input layer and an attribute vector output layer which comprises a first predetermined number of units, operatively coupled to a long short-term memory (LSTM) network which comprises a second predetermined number of hidden units which is equal to the first predetermined number of units, wherein an output of the attribute vector output layer is operatively coupled to an input of an attribute vector input layer of the LSTM network, and wherein the attribute vector input layer of the LSTM network comprises a hidden state of the LSTM network at a first evaluation step, and wherein the instructions, upon execution by one or more processors, cause the one or more processors to:
obtain a dataset comprising a plurality of attributed sequences based on user behavior associated with user actions; and
for each attributed sequence in the dataset,
train the multilayer feedforward neural network using the attribute data part of the attributed sequence via back-propagation with respect to a first objective function; and
train the LSTM network using the sequence data part of the attributed sequence via back-propagation with respect to a second objective function,
wherein training of the multilayer feedforward neural network is coupled with training the LSTM network such that, in use, the machine learning system is configured to:
identify common behaviors based on clusters in points in feature space;
determine a fixed-length feature representation of input attributed sequence data based on an analysis of the user behavior associated with the user actions within the fraud detection system that includes the identified common behaviors, wherein the fixed-length feature representation of input attributed sequence data comprises the hidden state of the LSTM network at a final evaluation step;

identify potential fraudulent behaviors based on isolated points within the fixed-length feature representation; and output the fixed-length feature representation which encodes: i) dependencies between different attribute data elements in the attribute data part, ii) dependencies between different sequence data elements in the sequence data part, and iii) dependencies between attribute data elements and sequence data elements within the attributed sequence data.

* * * * *